United States Patent
Park et al.

(10) Patent No.: US 10,635,313 B2
(45) Date of Patent: Apr. 28, 2020

(54) OPERATING METHODS OF SEMICONDUCTOR DEVICE AND MEMORY SYSTEM EACH INCLUDING MULTI-CONNECTION PORT, AND COMMUNICATION METHOD OF STORAGE SYSTEM

(71) Applicant: SAMSUNG ELECTRONICS CO., LTD., Suwon-si, Gyeonggi-Do (KR)

(72) Inventors: Hyun-Tae Park, Suwon-si (KR); Hwa-Seok Oh, Yongin-si (KR); Jin-Hyeok Choi, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 91 days.

(21) Appl. No.: 15/392,695

(22) Filed: Dec. 28, 2016

(65) Prior Publication Data
US 2017/0199673 A1    Jul. 13, 2017

(30) Foreign Application Priority Data

Jan. 12, 2016    (KR) .................. 10-2016-0003671

(51) Int. Cl.
*G06F 12/00*    (2006.01)
*G06F 3/06*    (2006.01)

(52) U.S. Cl.
CPC .......... *G06F 3/0607* (2013.01); *G06F 3/0638* (2013.01); *G06F 3/0661* (2013.01); *G06F 3/0679* (2013.01); *G06F 3/0688* (2013.01)

(58) Field of Classification Search
CPC .. H04B 10/272; G06F 13/4247; H04L 7/0054
See application file for complete search history.

(56) References Cited

U.S. PATENT DOCUMENTS

| | | | |
|---|---|---|---|
| 6,493,770 B1 | 12/2002 | Sartore et al. | |
| 6,820,148 B1 | 11/2004 | Cedar et al. | |
| 7,685,126 B2 | 3/2010 | Patel et al. | |
| 7,707,339 B2 | 4/2010 | Pigott et al. | |
| 8,301,822 B2 | 10/2012 | Pinto et al. | |
| 8,312,088 B2 | 11/2012 | Pinto | |
| 8,630,182 B2 | 1/2014 | Radke et al. | |
| 2010/0011164 A1* | 1/2010 | Choi ................ | G06F 12/0646 711/115 |

(Continued)

FOREIGN PATENT DOCUMENTS

KR    1020160112765    9/2016
KR    1020160122765    9/2016

OTHER PUBLICATIONS

Atef Allam, "A Protocol Stack Architecture for Optical Network-on-Chip" (Year: 2012).*

*Primary Examiner* — Ryan Bertram
*Assistant Examiner* — Trang K Ta
(74) *Attorney, Agent, or Firm* — Volentine, Whitt & Francos, PLLC

(57) ABSTRACT

An operating method of a semiconductor device and a memory system, each including a multi-connection port, includes: receiving connection information of a first device while connecting to the first device; updating information of a management table by using the connection information; and generating and transmitting a first packet including the connection information of the first device to a second device pre-connected to the memory system.

20 Claims, 25 Drawing Sheets

(56) References Cited

U.S. PATENT DOCUMENTS

| | | | |
|---|---|---|---|
| 2010/0272436 A1* | 10/2010 | Mizutani | H04B 10/272 398/25 |
| 2011/0022666 A1* | 1/2011 | Pinto | G06F 13/4247 709/206 |
| 2011/0072185 A1* | 3/2011 | Pinto | G06F 3/0607 710/315 |
| 2011/0283025 A1* | 11/2011 | Maxwell | G06F 3/0607 710/16 |
| 2013/0219381 A1 | 8/2013 | Lovitt | |
| 2015/0120975 A1 | 4/2015 | Sengoku | |
| 2015/0312006 A1* | 10/2015 | Goulahsen | H04L 7/0054 714/749 |
| 2016/0274821 A1 | 9/2016 | Park | |

* cited by examiner

FIG. 7

| Port | Valid | Dev ID (Order) |
|---|---|---|
| #0 | 1 | B – C |
| #1 | 1 | D – E – F |
| ⋮ | | |
| #n–1 | 1 | G – (H) |

Update

FIG. 12A

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | ESC_PA ||||||| | EscParam_PA=PACP_BEGIN |||||||||
| 0 | PACP_FunctionId=PACP_CAP_ind ||||||||||||||||
| 0 | TSleepNoConfig ||| Reserved |||| Flags ||| MaxHS ||| MaxPWM |||
| 0 | TStallNoConfig ||||||| TSaveConfig |||||||||
| 0 | VersionInfo ||||||||||||||||
| 0 | Reserved |||||||||| DevID ||||||
| 0 | Reserved ||||||||||||||||
| 0 | Reserved ||||||||||||||||
| 0 | CCITT CRC-16 ||||||||||||||||

ADD TO PACKET IN L1.5

FIG. 12B

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | ESC_PA ||||||||  EscParam_PA=PACP_BEGIN ||||||||
| 0 | PACP_FunctionId=PACP_CAP_ind ||||||||||||||||
| 0 | TSleepNoConfig |||| Reserved |||| Flags ||| MaxHS ||| MaxPWM |||
| 0 | TStallNoConfig |||||||| TSaveConfig ||||||||
| 0 | VersionInfo ||||||||||||||||
| 0 | Reserved |||||||||| Vendor ver ||||||
| 0 | Reserved |||||||||||| Attribute ||||
| 0 | Reserved |||||||||||| Capacity ||||
| 0 | CCITT CRC-16 ||||||||||||||||

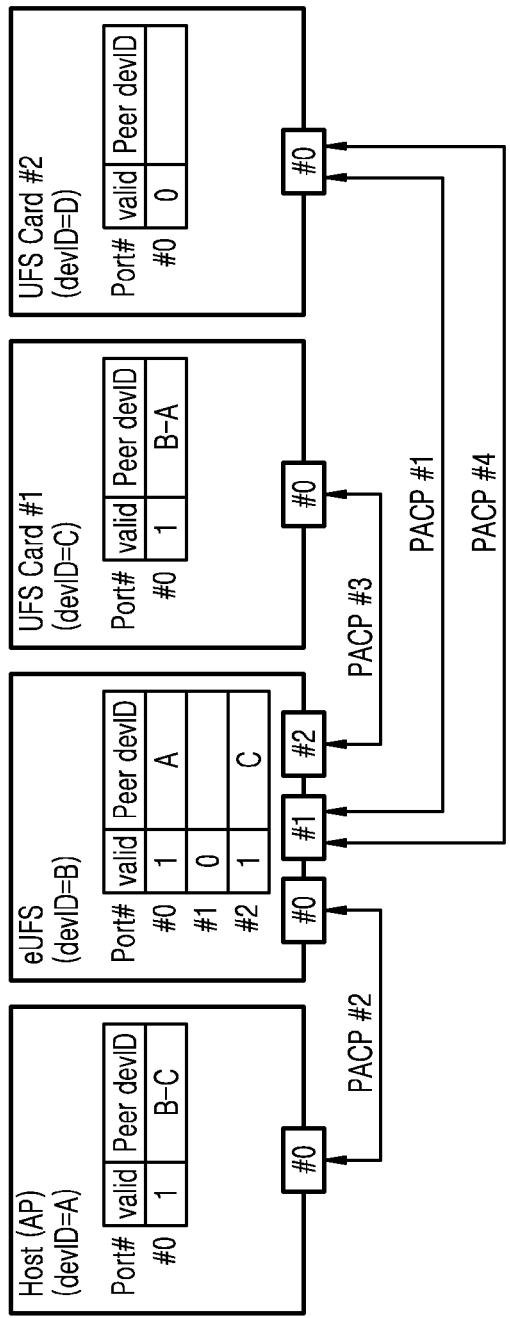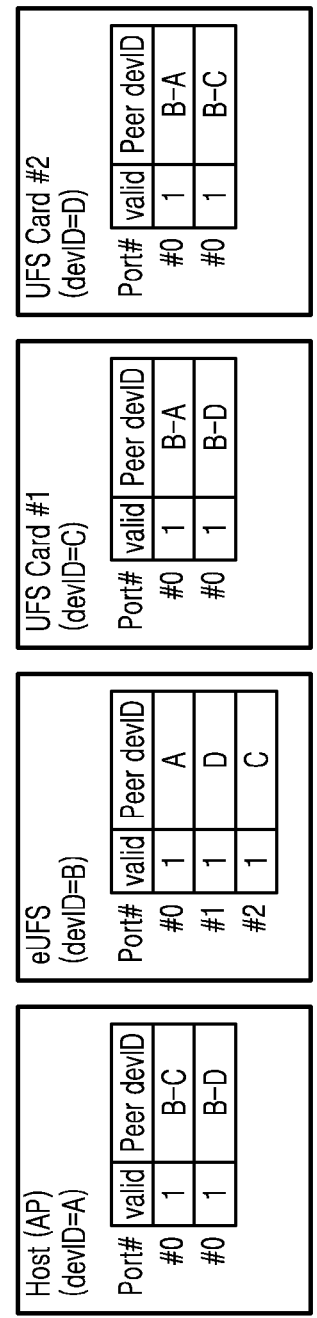
FIG. 15A
FIG. 15B

OPERATING METHODS OF SEMICONDUCTOR DEVICE AND MEMORY SYSTEM EACH INCLUDING MULTI-CONNECTION PORT, AND COMMUNICATION METHOD OF STORAGE SYSTEM

CROSS-REFERENCE TO RELATED APPLICATION

This application claims the benefit of Korean Patent Application No. 10-2016-0003671, filed on Jan. 12, 2016, in the Korean Intellectual Property Office, the disclosure of which is incorporated herein in its entirety by reference.

BACKGROUND

The inventive concept relates to a communication method of a storage system, and more particularly, to operating methods of a semiconductor device and a memory system each including a multi-connection port, and a communication method of a storage system.

A nonvolatile memory system includes a semiconductor device which maintains data stored therein even when power supply is interrupted. Examples of nonvolatile memory devices for a nonvolatile memory system include read-only memory (ROM), programmable ROM (PROM), electrically programmable ROM (EPROM), electrically erasable and programmable ROM (EEPROM), a flash memory, phase-change random access memory (PRAM), magnetic RAM (MRAM), resistive RAM (ReRAM), or ferroelectric RAM (FRAM). A nonvolatile memory system may include an embedded memory that is used by being combined with a mobile device, or a detachable memory card that is detachably attached to a general-purpose computer or a mobile device.

Meanwhile, as an example of the semiconductor device, an application processor (AP) may be connected to the embedded memory and the memory card, and the embedded memory and/or the memory card connected to the AP need to be efficiently managed. Meanwhile, the AP and the memory system may form a storage system.

SUMMARY

The inventive concept may support a multi-connection of an application processor, an embedded memory, and a memory card in a mobile platform, and efficiently manage devices in the mobile platform.

According to an aspect of the inventive concept, there is provided an operating method of a memory system, the operating method including: receiving connection information of a first device while connecting the memory system to the first device; updating information of a management table of the memory system by using the connection information; and generating and transmitting a first packet including the connection information of the first device to a second device pre-connected to the memory system.

According to another aspect of the inventive concept, there is provided an operating method of a semiconductor device comprising a host, the operating method including: receiving connection information of an embedded memory as a physical connection to the embedded memory is detected through a first port of the host; transmitting connection information of the host to the embedded memory; and receiving connection information of an external memory system generated by the embedded memory, as the external memory system is physically connected to the embedded memory.

According to another aspect of the inventive concept, there is provided a communication method of a storage system, the communication method including: receiving, by a first device, a packet comprising identification (ID) information of a second device as the first device is connected to the second device; updating the ID information of the second device in a first management table included in the first device; and receiving, by the first device, a packet comprising ID information of at least one third device pre-connected to the second device.

According to another aspect of the inventive concept, there is provided a memory system including: a memory controller including a device interface, wherein the device interface includes a management table storing connection information of one or more external devices; and a memory device including a plurality of memory cells, wherein the memory system is connected to a host through a first port of the device interface and is detachably connected to an external memory through a second port of the device interface, and when connection to the external memory is detected, the memory controller updates identification (ID) information of the external memory in the management table and transmits the ID information of the external memory to the host.

BRIEF DESCRIPTION OF THE DRAWINGS

Embodiments of the inventive concept will be more clearly understood from the following detailed description taken in conjunction with the accompanying drawings in which:

FIG. 7 is a diagram showing an example of a management table included in a multi-link manager of FIG. 6.

FIGS. 12A and 12B are diagrams showing various examples of a packet providing connection information during device connection.

FIGS. 15A and 15B are block diagrams for describing an embodiment of update operations of a management table of a device.

DETAILED DESCRIPTION OF THE EMBODIMENTS

Figure 1:
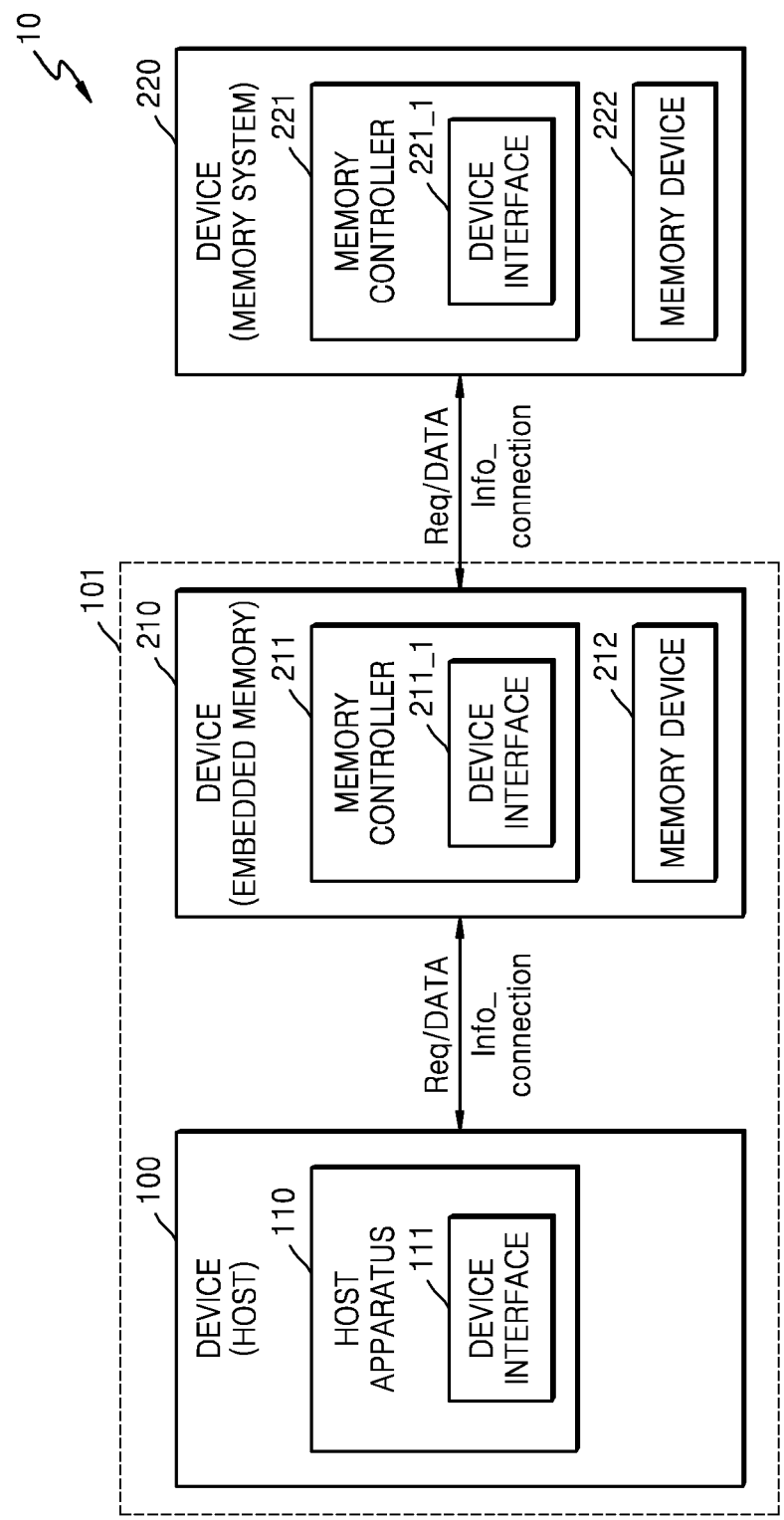
FIG. 1 is a block diagram of an embodiment of a storage system.

FIG. 1 is a block diagram of an embodiment of a storage system 10.

Storage system 10 may include various devices for exchanging data, wherein each device may be realized as a semiconductor device. For example, storage system 10 may include, as the semiconductor devices, a host 100 and one or more memory system. The memory systems according to one or more embodiments may correspond to an embedded memory 210 and a memory system 220, shown in FIG. 1.

Host 100 and the at least one memory system may constitute one system. For example, while host 100 is included in a data processing system 101, such as a mobile terminal, embedded memory 210 may be mounted in data processing system 101. Memory system 220 of FIG. 1 is a device detachably connectable to data processing system 101, such as a memory card, and when memory system 220 is used, host 100, embedded memory 210, and memory system 220 may constitute data processing system 101.

Each of embedded memory 210 and memory system 220 may include various types of memory devices, for example, flash memory devices and nonvolatile memory devices, such as resistive random access memory (ReRAM), magnetic RAM (MRAM), and programmable RAM (PRAM). For example, embedded memory 210 may include a memory controller 211 and a memory device 212, and memory system 220 may include a memory controller 221 and a memory device 222. Host 100 may provide various request signals Req related to data access to embedded memory 210 and memory system 220, and accessed data DATA may be exchanged between host 100 and embedded memory 210, and memory system 220.

Host 100 may include various types of apparatuses capable of processing data, for example, a host apparatus 110. Host apparatus 110 may denote hardware or a circuit realized in host 100, and may perform intrinsic functions according to the realized hardware. Host apparatus 110 may control various operations related to data processes, and for example, may control operations related to memory access.

Also, host 100 may be realized as a central processing unit (CPU), a processor, a microprocessor, or an application processor AP. Alternatively, host 100 may be realized as a system-on-chip (SoC). Hereinafter, that host 100 communicates with embedded memory 210 and memory system 220 may also be understood that host apparatus 110 communicates with embedded memory 210 and memory system 220 through a device interface 111.

Host 100 may communicate with embedded memory 210 and memory system 220 through various standard interfaces. For example, host 100 may include device interface 111, and embedded memory 210 and memory system 220 may respectively include device interfaces 211_1 and 221_1. Host 100 may communicate with external devices through device interface 111. Also, embedded memory 210 and memory system 220 may communicate with external devices respectively through device interfaces 211_1 and 221_1.

Each of device interfaces 111, 211_1, and 221_1 supports one of more of various standard interfaces. Examples of the standard interfaces include advanced technology attachment (ATA), serial ATA (SATA), external SATA (e-SATA), a small computer small interface (SCSI), a serial attached SCSI (SAS), peripheral component interconnection (PCI), PCI express (PCI-E), IEEE 1394, a universal serial bus (USB), a secure digital (SD) card, a multimedia card (MMC), an embedded multimedia card (eMMC), universal flash storage (UFS), and a compact flash (CF) card interface.

In FIG. 1, each of host 100, embedded memory 210, and memory system 220 may correspond to a device performing network communication in a mobile platform. Device interface 111 of host 100 may be referred to as a memory interface since an interface is performed with an external memory. Also, each of device interfaces 211_1 and 221_1 of embedded memory 210 and memory system 220 may be referred to as a host interface since a memory operation is performed according to a request from host 100.

According to an embodiment, host 100 may be connected to various types of memory systems through device interface 111 to manage the memory systems. Host 100 and the memory systems may be connected to each other according to various forms of network topologies. For example, host 100 and the memory systems may be connected to each other according to chain (or daisy-chain) topology, wherein host 100 is physically connected to embedded memory 210 and embedded memory 210 is physically connected to memory system 220.

According to the chain topology, each of the devices in the mobile platform may be multi-connected to the other devices. For example, host 100 may be connected to embedded memory 210 and memory system 220 through any ports, wherein host 100 is physically connected to embedded memory 210 and is indirectly connected to memory system 220. Also, embedded memory 210 may be physically connected to host 100 and memory system 220 through two different ports. Meanwhile, memory system 220 is a detachable device in the mobile platform, and may be physically connected to embedded memory 210 and indirectly connected to host 100.

According to an embodiment, memory system 220 may be realized as a detachable card storage device. For example, memory system 220 may be realized as a personal computer (PC) card (personal computer memory card international association (PCMCIA)), a compact flash (CF) card, a smart media card (SM/SMC), a memory stick, a multimedia card (MMC), a reduced size MMC (RS-MMC), a micro MMC (MMC), a secure digital (SD) card, a mini SD card, a micro SD card, or a universal flash storage (UFS) card. As another example, memory system 220 may be realized as a detachable solid state disk/drive (SSD). Memory system 220 may support hot-plug, and accordingly, memory system 220 may be physically connected to host 100 or embedded memory 210 while storage system 10 is turned on.

When memory system 220 detects a connection with an external device as a port of memory system 220 and a port of embedded memory 210 are physically connected to each other, a link startup process for a link-connection between embedded memory 210 and memory system 220 is performed. Also, during the link startup process, connection information Info_connection for the link-connection between embedded memory 210 and memory system 220 may be exchanged, and according to an embodiment, the connection information Info_connection including device information may be included in a packet and exchanged between embedded memory 210 and memory system 220.

According to an embodiment, when memory system 220 is newly connected to embedded memory 210, the connection information Info_connection related to memory system 220 may be provided to host 100. For example, the connection information Info_connection may be provided to host 100 from embedded memory 210. Also, each of host 100 and embedded memory 210 may include a multi-link manager (not shown) managing connection information of various devices in the mobile platform, and each of host 100 and embedded memory 210 may update a management table in the multi-link manager by using the connection information Info_connection.

Also, according to an embodiment, embedded memory 210 may provide connection information of existing devices included in the mobile platform to memory system 220 that is newly connected. For example, embedded memory 210 may provide the connection information Info_connection related to host 100 that is a pre-connected device to memory system 220. Memory system 220 may include a multi-link manager (not shown), and may update a management table in the multi-link manager by using the connection information Info_connection.

Storage system 10 according to an embodiment may provide in real-time multi-connections between host 100, embedded memory 210, and memory system 220 in the mobile platform, and in addition, may manage connection information of devices in real-time, and thus storage system 10 may efficiently use various storage devices. Also, in terms of host 100, since host 100 does not have to include a separate interface for each of the devices that are multi-connected, host 100 may use various devices through one interface (or one port), and thus burdens on size and power may be reduced.

Figure 2:
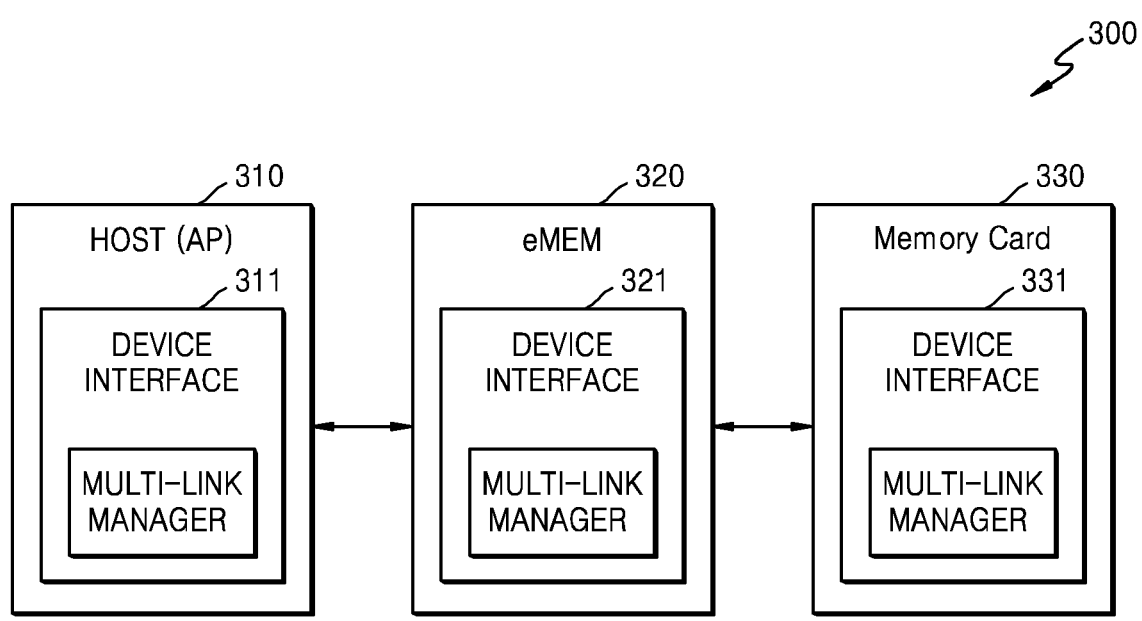
FIG. 2 is a block diagram showing connection relationships between devices in an embodiment of a storage system.

FIG. 2 is a block diagram showing connection relationships between devices in an embodiment of a storage system 300.

Referring to FIG. 2, storage system 300 may include a host 310 and a plurality of memory systems. As examples of the memory systems, an embedded memory 320 and a memory card 330 may be included in storage system 300. In FIG. 2, host 310 corresponds to the application processor AP.

Embedded memory 320 and memory card 330 may include various types of memory devices, and embedded memory 320 and memory card 330 may each be a memory system communicating according to various interfaces. For example, each of embedded memory 320 and memory card 330 may perform communication according to various interfaces, such as PCI and SATA described above, and when embedded memory 320 and memory card 330 communicate according to a UFS protocol, embedded memory 320 may be referred to as a UFS embedded memory and memory card 330 may be referred to as a UFS memory card. A UFS storage device is a storage device designed for mobile applications and computing systems that require high performance and low power consumption, and may communicate with an external device according to the UFS protocol.

For communication with an external device, each device may include an interface supporting various protocols. For example, host 310 may include a device interface 311, and embedded memory 320 and memory card 330 may respectively include device interfaces 321 and 331. When device interfaces 311 through 331 correspond to UFS interfaces, device interfaces 311 through 331 may perform communication according to specifications described in the UFS specification of JEDEC standards.

Device interface 311 included in host 310 may be referred to as a memory interface since an interface is performed with a memory system. Also, device interfaces 321 and 331 respectively included in embedded memory 320 and memory card 330 may be referred to as host interfaces since an interface is performed with a host. Also, each of device interfaces 311 through 331 may include a multi-link manager.

As storage system 300 communicates according to an applied interface, each of device interfaces 311 through 331 may include a link layer (not shown) and a physical layer (not shown). The link layer may generate a transmission signal according to a certain rule (for example, a communication protocol), and receive a reception signal according to the certain rule. The link layer may include, from among open systems interconnection (OSI) layers, a physical adapter layer (L1.5), a data link layer (L2), a network layer (L3), and a transport layer (L4). The link layer may include UniPro, as defined by the Mobile Industry Processor Interface (MIPI) alliance.

Meanwhile, the physical layer may transmit a transmission signal according to a certain rule, and the physical layer may receive a reception signal according to a certain rule. The physical layer may correspond to a physical layer (L1) from among OSI layers. The physical layer may include M-PHY defined by MIPI alliance.

Storage system 300 according to an embodiment may use various interfaces other than the UFS interface described above. For example, all interfaces using UniPro and M-PHY defined by MIPI may be applied to storage system 300. Accordingly, devices included in storage system 300 may be various devices of the same or different types (or various devices using different interfaces).

According to storage system 300 of FIG. 2, a mobile platform-based storage system capable of multiple connections is provided, and embedded memory 320 and memory card 330 may be simultaneously used. Also, considering a detaching characteristic of memory card 330, when it is detected that memory card 330 is connected to embedded memory 320, connection information of multi-connected devices may be managed by the multi-link manager in the link layer (UniPro). For example, connection information including identification (ID) information (or device ID) of memory card 330 that is newly connected may be managed by the multi-link manager of host 310 as the connection information is transmitted to host 310, and connection information including ID information of host 310 that is pre-connected may be managed by the multi-link manager of memory card 330 as the connection information is transmitted to memory card 330.

FIGS. 3A through 5B are block diagrams showing embodiments of various network topologies applicable to a storage system. Descriptions about components included in each device are not provided for convenience of description while describing FIGS. 3A through 5B.

Figure 3A:
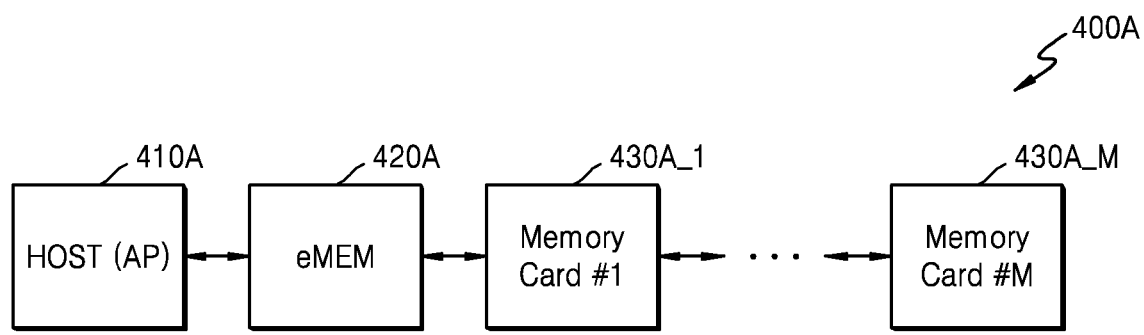
FIGS. 3A, 3B, 4A, 4B, 5A, and 5B are block diagrams showing embodiments of various network topologies applicable to a storage system.

Referring to FIG. 3A, a storage system 400A may include a host 410A, an embedded memory 420A, and first through $M^{th}$ memory cards 430A_1 through 430A_M. For example, host 410A and embedded memory 420A may be physically connected to each other, and first through $M^{th}$ memory cards 430A_1 through 430A_M may be detachable devices. As a connection example, first memory card 430A_1 may be physically connected to embedded memory 420A, second memory card 430A_2 may be physically connected to first memory card 430_1, and third through $M^{th}$ memory cards 430A_3 through 430A_M may be sequentially connected according to a serial connection manner.

For example, when first memory card 430A_1 is physically connected to embedded memory 420A, connection information including a device ID may be exchanged between first memory card 430A_1 and embedded memory 420A through a link startup process. Also, connection information of first memory card 430A_1 that is newly connected may be transmitted to host 410A, and connection information of host 410A that is pre-connected may be provided to first memory card 430A_1.

Alternatively, when $M^{th}$ memory card 430A_M is newly connected to M-$1^{th}$ memory card 430A_(M-1), connection information of $M^{th}$ memory card 430A_M may be provided to each of host 410A, embedded memory 420A, and first through M-$2^{th}$ memory cards 430A_1 through 430A_(M-2), which are pre-connected, and also, connection information of host 410A, embedded memory 420A, and first through M-$2^{th}$ memory cards 430A_1 through 430A_(M-2) may be provided to $M^{th}$ memory card 430A_M.

Figure 3B:
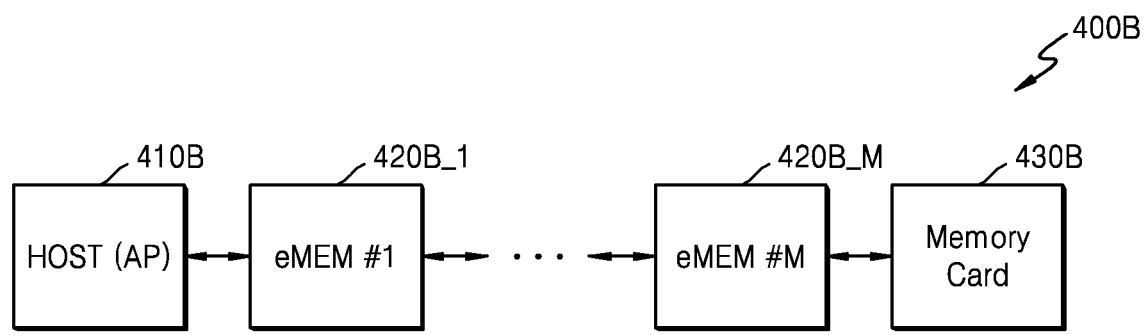

Meanwhile, referring to FIG. 3B, a storage system 400B may include a host 410B, first through $M^{th}$ embedded memories 420B_1 through 420B_M, and a memory card 430B. For example, host 410B and first through $M^{th}$ embedded memories 420B_1 through 420B_M may be physically connected to each other, and memory card 430B may be a detachable device.

For example, when memory card 430B is physically connected to one of first through $M^{th}$ embedded memories 420B_1 through 420B_M (for example, $M^{th}$ embedded memory 420B_M), connection information including a device ID may be exchanged between memory card 430B and $M^{th}$ embedded memory 420B_M through a link startup process. Also, connection information of memory card 430B that is newly connected may be transmitted to host 410B, and connection information of host 410B that is pre-connected may be provided to memory card 430B.

Alternatively, when memory card 430B is physically newly connected to $M^{th}$ embedded memory 420B_M, the connection information of memory card 430B may be provided to each of host 410B and first through M-$1^{th}$ embedded memories 420B_1 through 420B_(M-1), which are pre-connected, and the connection information of host 410B and first through M-$1^{th}$ embedded memories 420B_1 through 420B_(M-1) may be provided to memory card 430B.

Figure 4A:
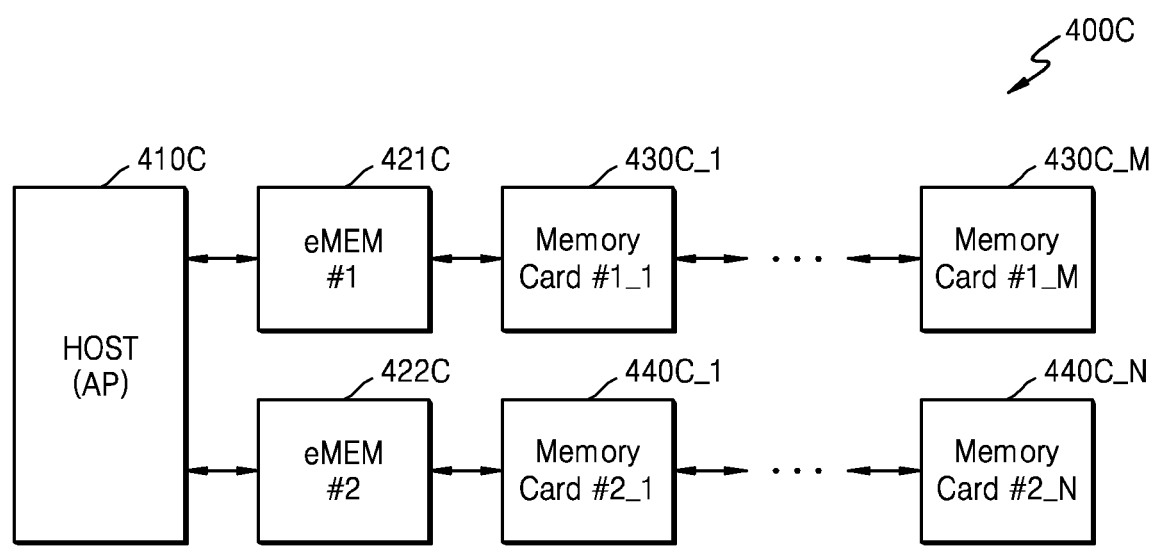

Meanwhile, referring to a storage system 400C of FIG. 4A, a host 410C may be physically connected to at least two memory systems through at least two ports. For example, host 410C may be physically connected to a first embedded memory 421C through one port and to a second embedded memory 422C through another port. Also, a plurality of detachable memory cards may each communicate with host 410C through first embedded memory 421C and second embedded memory 422C. As a connection example, first through $M^{th}$ memory cards 430C_1 through 430C_M may be sequentially connected to first embedded memory 421C, and first through $N^{th}$ memory cards 440C_1 through 440C_N may be sequentially connected to second embedded memory 422C.

Figure 4B:
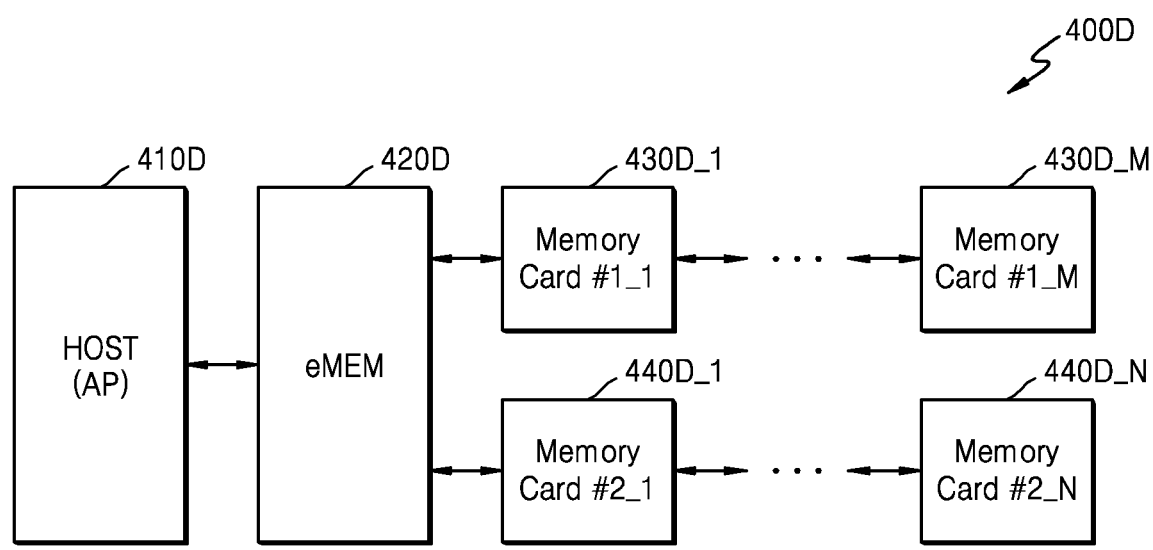

Meanwhile, referring to a storage system 400D of FIG. 4B, a host 410D may be physically connected to an embedded memory 420D, and embedded memory 420D may be physically connected to at least two memory systems through at least two ports. For example, first through $M^{th}$ memory cards 430D_1 through 430D_M may be sequentially connected to one port of embedded memory 420D and first through $N^{th}$ memory cards 440D_1 through 440D_N may be sequentially connected to another port of embedded memory 420D.

According to the embodiments shown in FIGS. 4A and 4B, connection information may be transferred via various methods when a memory card is newly connected. For example, in storage system 400C of FIG. 4A, when $M^{th}$ memory card 430C_M is connected to storage system 400C, connection information of $M^{th}$ memory card 430C_M may be provided to all devices (for example, pre-connected devices) in storage system 400C. Alternatively, the connection information may be provided only to devices (for example, host 410C, first embedded memory 421C, and first through M-$1^{th}$ memory cards 430C_1 through 430C_(M-1)) of a chain topology including $M^{th}$ memory card 430C_M. In storage system 400D of FIG. 4B, connection information may be transferred via similar or the same various methods described above.

Figure 5A:
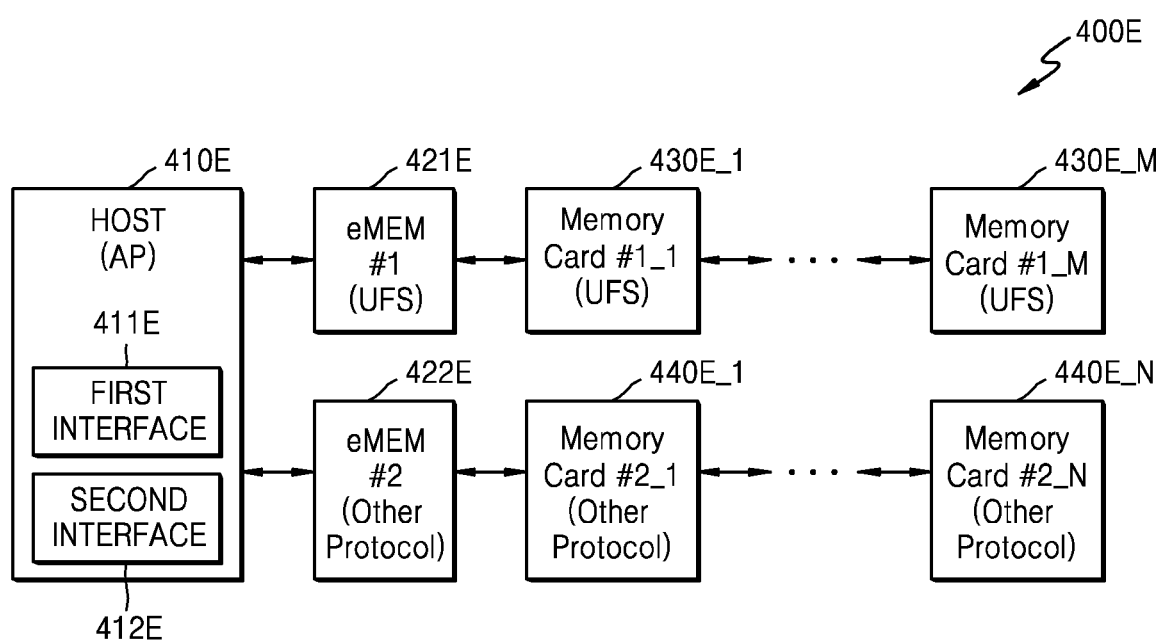
Figure 5B:
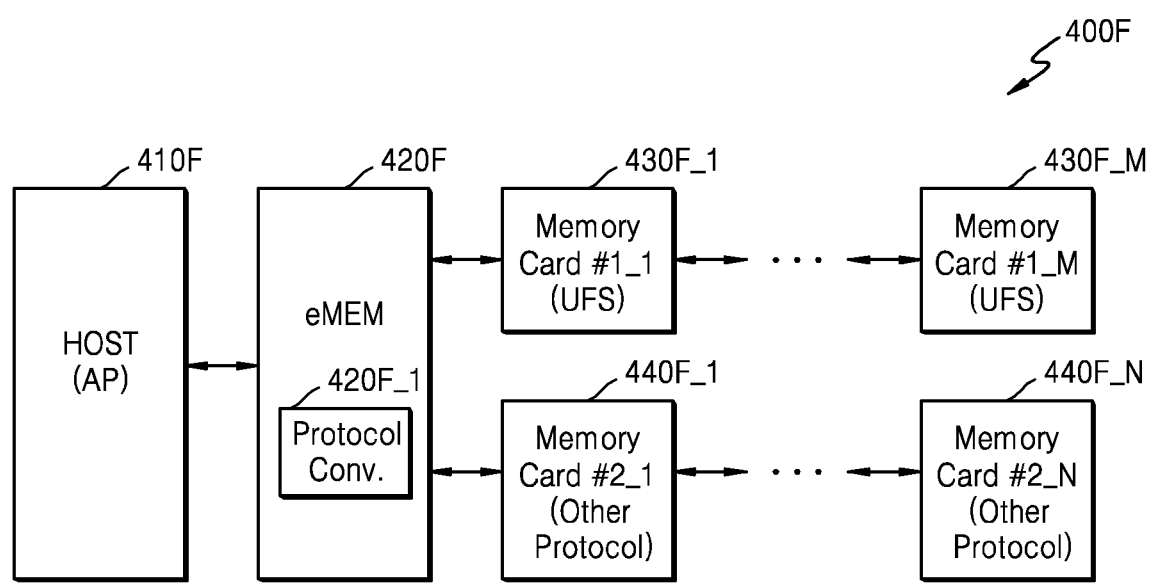

Meanwhile, in FIGS. 5A and 5B, memory systems which interface or communicate according to various protocols are applied to storage systems 400E and 400F.

Referring to FIG. 5A, a host 410E may be physically connected to at least two memory systems through at least two ports. For example, host 410E is physically connected to a first embedded memory 421E through one port, and physically connected to a second embedded memory 422E through another port. According to the current embodiment, first and second embedded memories 421E and 422E may perform communication according to different protocols than each other, and for example, various protocols, such as ATA, SATA, e-SATA, SCSI, SAS, PCI, PCI-E, IEEE 1394, USB, SD card, MMC, eMMC, UFS, and CF card interface described above, may be applied to each of first and second embedded memories 421E and 422E. In an example of FIG. 5A, first embedded memory 421E communicates according to a UFS protocol, and second embedded memory 422E communicates according to another protocol, such as SATA or eMMC. However, this is just one example and in other embodiments various other protocols may be employed.

First through $M^{th}$ memory cards 430E_1 through 430E_M communicating according to a UFS protocol may be sequentially connected to first embedded memory 421E, and first through $N^{th}$ memory cards 440E_1 through 440E_N communicating according to another protocol may be sequentially connected to second embedded memory 422E. Host 410E may communicate with memory systems according to at least two different protocols, and for example, host 410E may include first and second interfaces 411E and 421E for supporting at least two different protocols.

Meanwhile, referring to storage system 400F of FIG. 5B, a host 410F may be physically connected to an embedded memory 420F, and embedded memory 420F may be physically connected to at least two memory systems through at least two ports. For example, first through $M^{th}$ memory cards 430F_1 through 430F_M communicating according to a UFS protocol may be sequentially connected to one port of embedded memory 420F, and first through $N^{th}$ memory cards 440F_1 through 440F_N communicating according to another protocol may be sequentially connected to another port of embedded memory 420F.

According to an embodiment, embedded memory 420F communicates with different memory systems according to at least two different protocols, and communicates with host 410F according to one of the at least two protocols. Embedded memory 420F may include a protocol converter 420F_1 that performs a switching operation between different protocols.

According to the embodiments shown in FIGS. 5A and 5B, while integrally managing various memory systems connected to a storage system according to an embodiment, connection information may be managed even between memory systems using different protocols than each other. In this case, efficient memory management may be performed since memory systems configuring a storage system may be used while considering characteristics of each protocol.

Meanwhile, in the embodiments shown in FIGS. 3A through 5B, an embedded memory is included in a storage system, but an embodiment is not limited thereto. For example, a storage system may only include a host and memory cards, and when a new memory card is connected, connection information may be provided to pre-connected devices in a manner described above.

Figure 6:
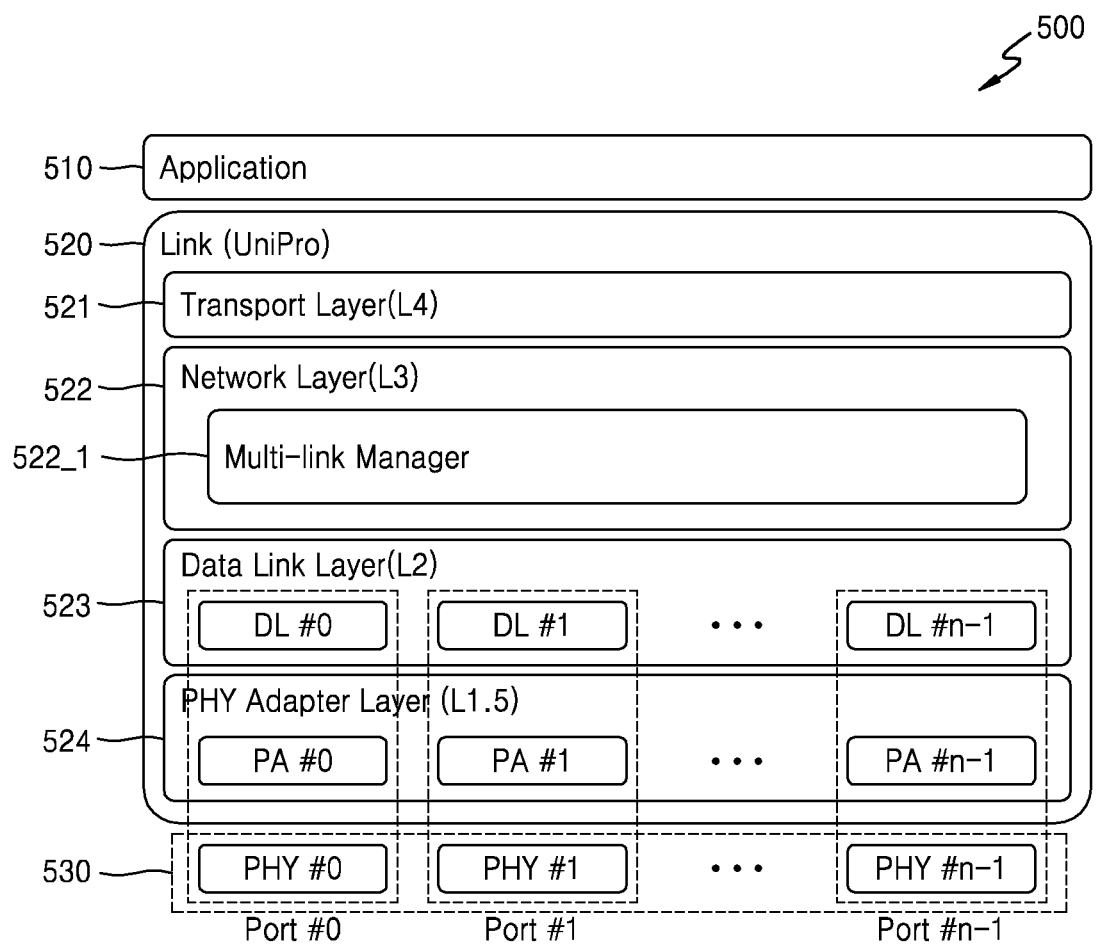
FIG. 6 is a block diagram of an embodiment of an interface in one or more devices.

FIG. 6 is a block diagram of an embodiment of an interface in one or more devices. The device shown in FIG. 6 may be a host or an embedded memory described above. Alternatively, the device shown in FIG. 6 may be a memory card described above. Hereinafter, it is assumed that the device shown in FIG. 6 is a UFS embedded memory.

Referring to FIG. 6, a UFS embedded memory 500 (or an interface of UFS embedded memory 500) may include an application layer 510, a link layer 520, and a physical layer 530. Also, link layer 520 may include a transport layer 521 (L4), a network layer 522 (L3), a data link layer 523 (L2), and a physical adapter layer 524 (L1.5). According to an embodiment, each layer included in link layer 520 may perform functions according to standards defined by UniPro. However, embodiments are not limited thereto, and any protocol other than UniPro may be used, and for example, link layer 520 may be replaced by MIPI low latency interface (LLI).

When the devices have a layer structure as shown in FIG. 6, the devices may perform peer-to-peer communication in which layers in the same hierarchy are connected 1:1. For example, application layer 510 may provide a network service of a user program, as a layer of an upper hierarchy. Transport layer 521 may provide a function related to error detection and recovery for stable transmission and reception of data, and network layer 522 may provide a function of selecting an optimum path of communication between devices. Meanwhile, data link layer 523 and physical adapter layer 524 support a physical data transmission function between devices, and for example, may provide a function of adding a physical address to a packet. Meanwhile, physical layer 530 may be in charge of electrical transmission using a voltage, a current, or the like between devices according to a certain standard.

UFS embedded memory 500 may support multi-connection ports, and according to an embodiment, physical layer 530, physical adapter layer 524, and data link layer 523 may independently exist according to the multi-connection ports. For example, a first physical layer PHY #0, a first physical adapter layer PA #0, and a first data link layer DL #0 may exist correspondingly to a first port Port #0, and similarly, an $n^{th}$ physical layer PHY # n−1, an $n^{th}$ physical adapter layer PA # n−1, and an $n^{th}$ data link layer DL # n−1 may exist correspondingly to an $n^{th}$ port Port # n−1.

According to the embodiments described above, UFS embedded memory 500 may include a multi-link manager 522_1, and according to an embodiment, multi-link manager 522_1 may be included in network layer 522. Multi-link manager 522_1 may include a management table (not shown) for managing connection information of a plurality of devices included in a storage system. Multi-link manager 522_1 may store connection information of a plurality of devices physically or indirectly connected through the first through $n^{th}$ ports Port #0 through Port # n−1, and when a device is newly connected to the storage system, multi-link manager 522_1 may receive connection information of the newly connected device and update the management table based on the connection information.

An example of the management table included in multi-link manager 522_1 of FIG. 6 will now be described.

FIG. 7 is a diagram showing an example of a management table included in multi-link manager 522_1 of FIG. 6. In FIG. 7, a plurality of devices (for example, devices A through H) perform network communication, and ID information of each device is stored in the management table. Also, in the case of the management table of FIG. 7, the corresponding device of FIG. 6 (for example, UFS embedded memory 500) corresponds to the device A, and UFS embedded memory 500 may be physically or indirectly connected to other devices (for example, the devices B through H).

Referring to FIGS. 6 and 7, UFS embedded memory 500 includes the first through $n^{th}$ ports Port #0 through Port # n−1, and multi-link manager 522_1 may include the management table storing table information related to the first through $n^{th}$ ports Port #0 through Port # n−1. For example, the management table may include a valid field indicating whether each port is connected and valid, and an ID field indicating ID information of a connected device. Also, the ID field may also include order information indicating a connection order (for example, a physical connection order) of devices connected to each port. Various types of information stored in the management table may have any one of various structures, such as a linked-list structure or a tree structure.

UFS embedded memory 500 may be multi-connected to a plurality of devices by including a plurality of ports. Also, UFS embedded memory 500 may be multi-connected to a plurality of devices through one port. For example, UFS embedded memory 500 may be in a valid connection state with an external device through the first port Port #0, and for example, may be sequentially connected to the devices B and C through the first port Port #0. In other words, UFS embedded memory 500 may be physically connected to the device B through the first port Port #0, and the device B may be physically connected to the device C.

Also, UFS embedded memory 500 may be physically connected to the device D through the second port Port #1, the device D may be physically connected to the device E, and the device E may be physically connected to the device F. Also, UFS embedded memory 500 may be physically connected to the device G through the $n^{th}$ port Port # n−1.

When connection states of devices related to UFS embedded memory 500 are changed, multi-link manager 522_1 may update the management table based on exchanged connection information. For example, when the device G connected to the $n^{th}$ port Port # n−1 of UFS embedded memory 500 and the device H are newly physically connected, connection information may be exchanged through a link startup process between the device G and the device H. Also, during or after the link startup process, the device G may transmit connection information including ID information of the device H to UFS embedded memory 500. Multi-link manager 522_1 of UFS embedded memory 500 updates the management table based on received connection information, and accordingly, the ID information of the device H may be added to the ID field corresponding to the $n^{th}$ port Port # n−1.

As described above with reference to FIGS. 6 and 7, an interface of a device according to one or more embodiments may include a combination of UniPro and M-PHY. Accordingly, one or more embodiments may be applied to communication between any type of host apparatus and devices, in addition to the UFS interface described above. For example, one or more embodiments may be applied to a display serial interface (DSI) or a camera serial interface (CSI) using a combination of UniPro and M-PHY.

Figure 8:
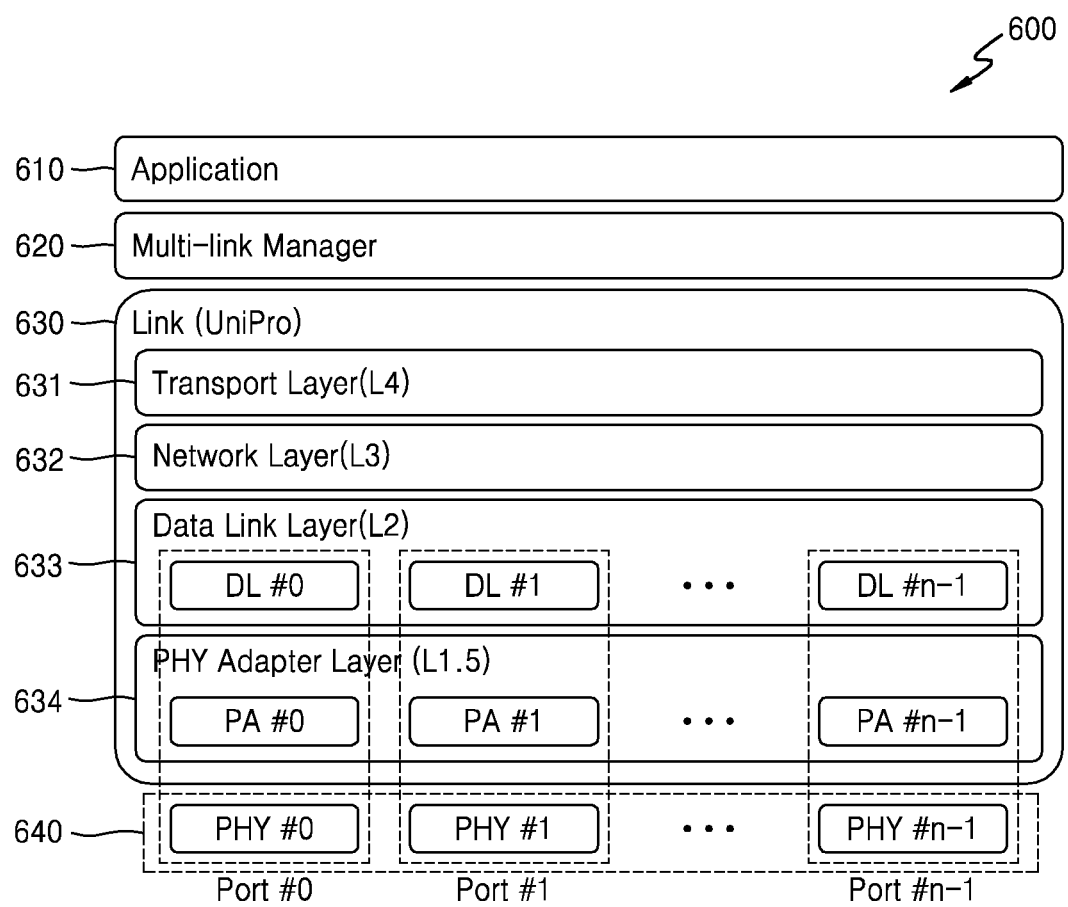
FIG. 8 is a block diagram of another embodiment of an interface in one or more devices.

FIG. 8 is a block diagram of another embodiment of an interface in one or more devices. The device shown in FIG. 8 may be a host, an embedded memory, or a memory card described above. Hereinafter, it is assumed that the device shown in FIG. 8 is a UFS embedded memory.

Referring to FIG. 8, a UFS embedded memory 600 (or an interface of UFS embedded memory 600) may include an application layer 610, a multi-link manager 620, a link layer 630, and a physical layer 640. Also, link layer 630 may include a transport layer 631 (L4), a network layer 632 (L3), a data link layer 633 (L2), and a physical adapter layer 634 (L1.5). Also, while realizing multi-connection ports, physical layer 640, physical adapter layer 634, and data link layer 633 may independently exist according to the multi-connection ports. For example, a first physical layer PHY #0, a first physical adapter layer PA #0, and a first data link layer DL #0 may exist correspondingly to the first port Port #0, and similarly, an $n^{th}$ physical layer PHY # n−1, an $n^{th}$ physical adapter layer PA # n−1, and an $n^{th}$ data link layer DL # n−1 may exist correspondingly to the $n^{th}$ port Port # n−1.

According to the embodiment shown in FIG. 8, multi-link manager 620 may be realized as a layer separate from link layer 630, and accordingly, multi-connection management of devices may be performed outside link layer 630. For example, multi-link manager 620 may be located between application layer 610 and link layer 630 such that, when a new device is connected, connection information is provided from link layer 630 to multi-link manger 620, and also, connection information of pre-connected devices are provided from multi-link manager 620 to link layer 630.

Although not described in the above embodiments, a multi-link manager applied to one or more embodiments may be realized in any one of other various manners. For example, the multi-link manager may be realized as a separate functional block outside an application layer or a link layer. In other words, the multi-link manager may be realized as a separate functional block that is irrelevant to a layer, and may receive information related to a device ID from a link layer or provide information related to a device ID to the link layer.

Figure 9:
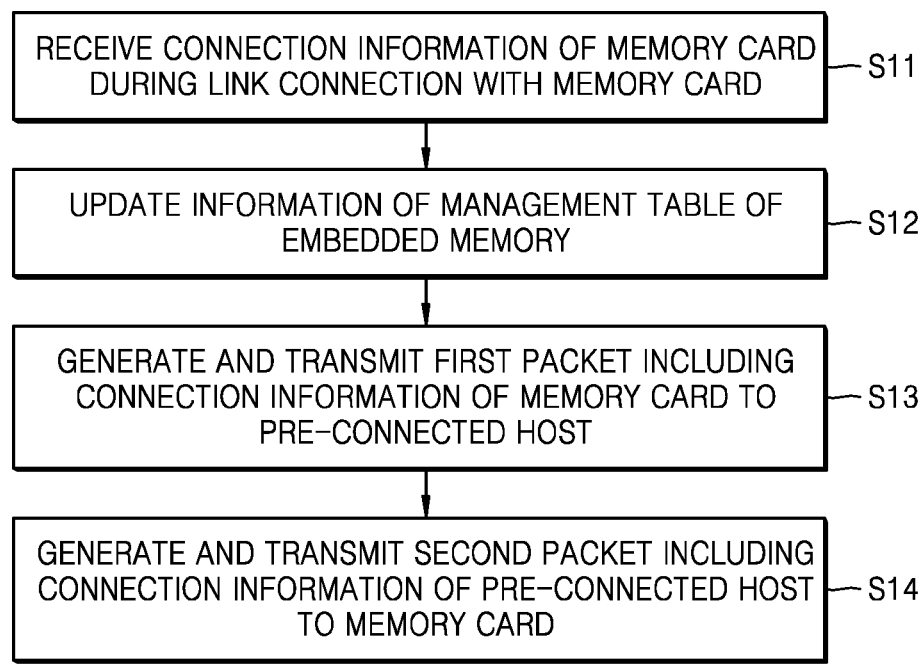
FIG. 9 is a flowchart of an embodiment of an operating method of a memory system.

FIG. 9 is a flowchart of an embodiment of an operating method of a memory system. In FIG. 9, an operating method of a host (or an application processor AP) is illustrated, and in detail, an operating method of an embedded memory connected between a host (or a host apparatus) and a memory card is illustrated.

Referring to FIG. 9, the embedded memory may be physically pre-connected to the host, such as an application processor AP, and may include at least one port detachably connected to an external memory system, such as a memory card. When the memory card is newly physically connected to the embedded memory, a link connection is performed between the embedded memory and the memory card, and accordingly, the embedded memory may receive connection information of the memory card in operation S11. As described above, the connection information may include ID information of the memory card in a manner described above.

The embedded memory includes a multi-link manager including a management table, and information of the management table is updated according to the connection information in operation S12. For example, when the memory card is connected to one port (a first port) of the embedded memory, values of various fields corresponding to the first port may be updated in the management table, and the ID information of the memory card may be updated in one field.

Also, in order to integrally manage a plurality of devices related to the embedded memory, the embedded memory may generate a packet including the connection information of the memory card and transmit the packet to a pre-connected host, in operation S13. Also, the embedded memory may generate a packet including connection information of the pre-connected host and transmit the packet to the memory card, in operation S14. The pre-connected host and the memory card may each include a management table for managing connection information, and update their management tables based on received information.

Figure 10:
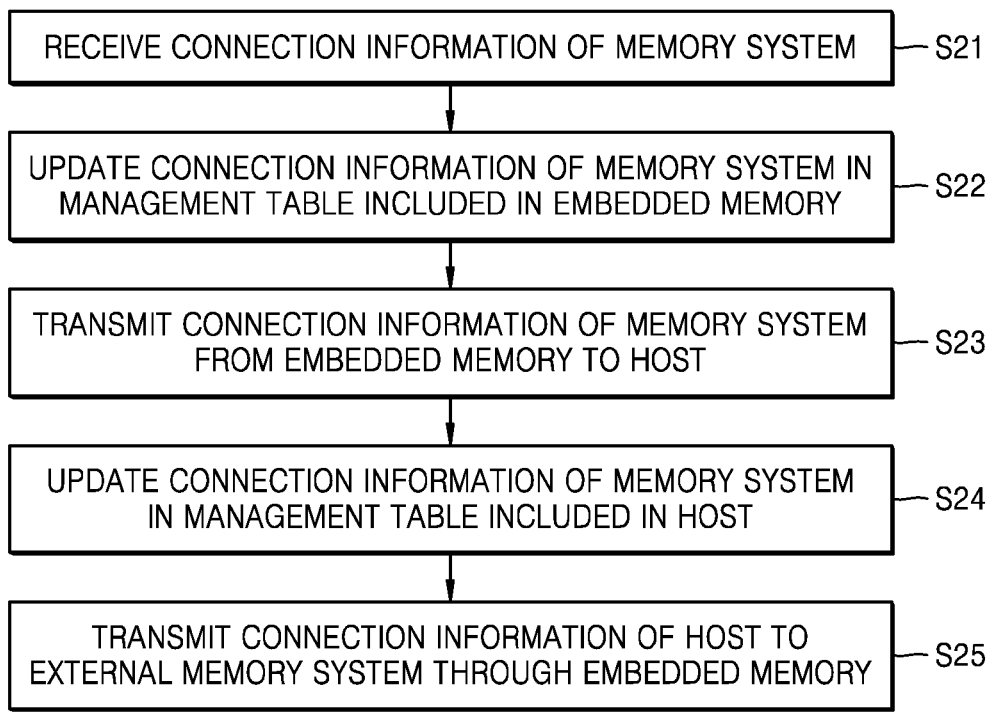
FIG. 10 is a flowchart of an embodiment of an operating method of a storage system.

FIG. 10 is a flowchart of an embodiment of an operating method of a storage system. In FIG. 10, an operating method of a storage system including a host and an embedded memory is illustrated.

The host may include a memory interface for connection with a device (for example, a memory system), and may be sequentially connected to at least two memory systems through the memory interface. In other words, one memory system may be physically connected to the host and at least another memory system may be indirectly connected to the host.

The memory system (for example, a memory card) is connected to the host via a physical connection with the embedded memory, and the embedded memory receives connection information of the memory system in operation S21. Connection information of the memory system is updated in a management table included in the embedded memory, in operation S22.

Also, the embedded memory transmits a packet including the connection information of the memory system to the host in operation S23, and the connection information of the memory system is updated in a management table included in the host in operation S24. The management table included in the host may store ID information of the memory system and information indicating a physical connection order of the embedded memory and the memory system. Also, the connection information of the host may be transmitted to an external memory system through the embedded memory in operation S25.

Figure 11:
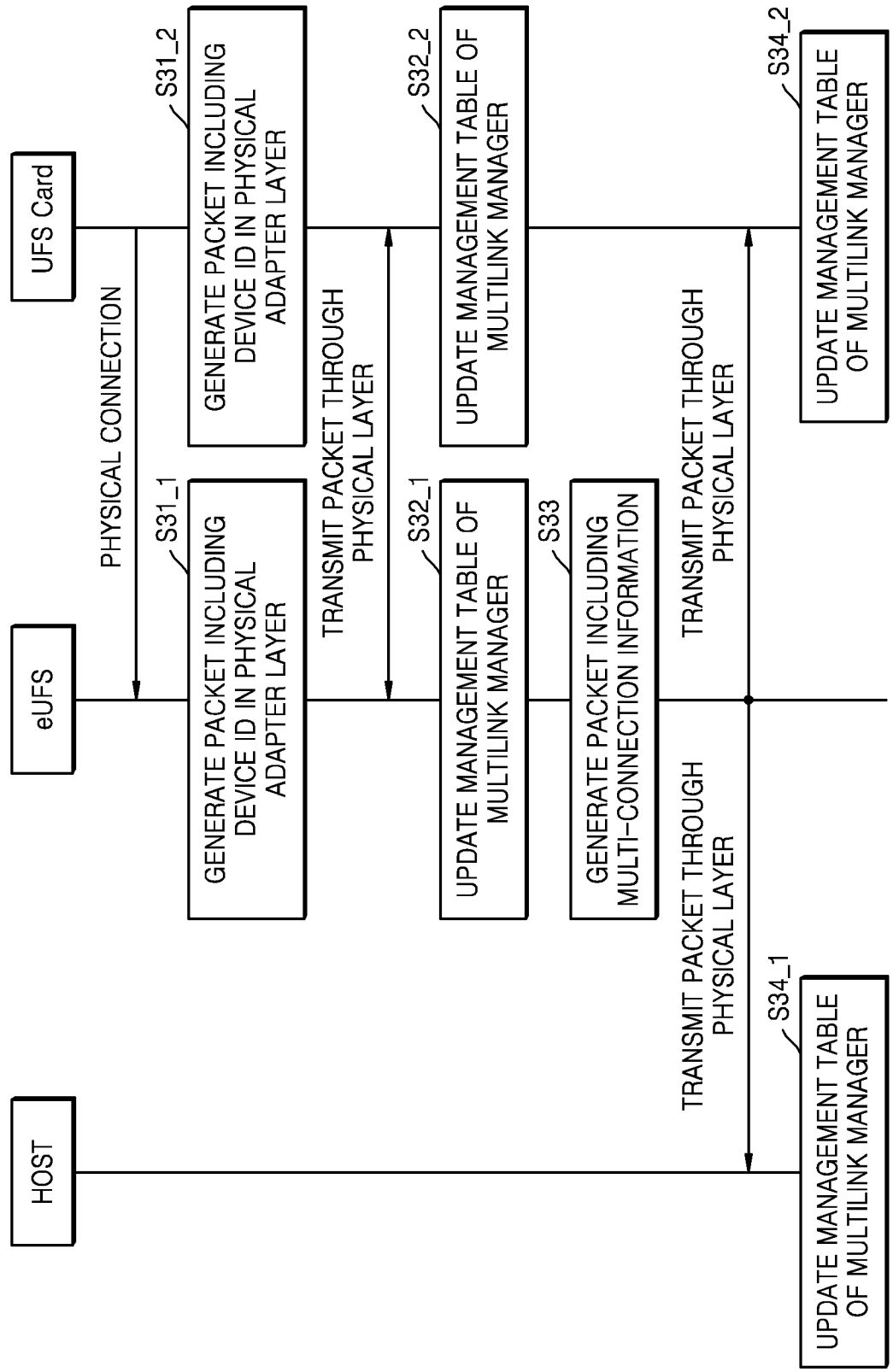
FIG. 11 is a flowchart of an embodiment of operations of updating connection information of devices in a storage system.

FIG. 11 is a flowchart of an embodiment of operations of updating connection information of devices in a storage system. In FIG. 11, a host HOST and a UFS embedded memory eUFS are pre-connected to each other, and a USF memory card UFS Card is newly connected to the UFS embedded memory eUFS.

As the UFS memory card UFS Card is physically connected to the UFS embedded memory eUFS, the UFS memory card UFS Card and the UFS embedded memory eUFS each detect a physical connection, and a link startup process for a link connection between the UFS memory card UFS Card and the UFS embedded memory eUFS may be performed. For example, the link startup process may include operations related to lane formation, such as lane discovery, lane realignment, and lane termination, and various types of information may be exchanged between the UFS memory card UFS Card and the UFS embedded memory eUFS during the link startup process.

For example, the UFS embedded memory eUFS may generate a packet including its device ID, and for example, the device ID may be added to the packet in a physical adapter layer (L1.5) and provided to the UFS memory card UFS Card, in operation S31_1. Similarly, the UFS memory card UFS Card may add a device ID to a packet in the physical adapter layer, and provide the packet including the device ID to the UFS embedded memory eUFS, in operation S31_2.

The packets generated as above may be exchanged through a physical layer, and the UFS memory card UFS Card and the UFS embedded memory eUFS may process the received packets to extract the device ID included therein. Also, a management table of a multi-link manager may be updated by using the extracted device ID. For example, when the UFS embedded memory eUFS updates the management table of the multi-link manager in operation S32_1, ID information of the UFS memory card UFS Card may be added to table information. Similarly, when the UFS memory card UFS Card updates the management table of the multi-link manager in operation S32_2, ID information of the UFS embedded memory eUFS may be added to table information.

The UFS embedded memory eUFS may generate a packet including multi-connection information in operation S33_1, and for example, the multi-connection information may be added to the packet in the physical adapter layer. For example, multi-connection information indicating that the UFS memory card UFS Card is newly connected to the UFS embedded memory eUFS may be added to the packet and provided to the host HOST through a physical layer. The multi-connection information may include information about a connection order of devices connected to the host HOST physically or indirectly. The host HOST updates a management table of a multi-link manager based on the received multi-connection information in operation S34_1, and accordingly, connection information of a plurality of devices connected to any one port of the host HOST may be stored in the multi-link manager of the host HOST.

Similarly, multi-connection information indicating that the UFS embedded memory eUFS is pre-connected to the host HOST may be added to a packet and provided to the UFS memory card UFS Card through the physical layer. The UFS memory card UFS Card may update the management table of the multi-link manager based on the received multi-connection information in operation S34_2, and accordingly, connection information of a plurality of devices connected to any one port of the UFS memory card UFS Card may be stored in the multi-link manager. Also, according to the multi-connection information, information indicating a connection order of devices physically or indirectly connected to the UFS memory card UFS Card may be stored in the management table of the UFS memory card UFS Card.

FIGS. 12A and 12B are diagrams showing various examples of a packet providing connection information during device connection.

Referring to FIG. 12A, connection information of a new device may be exchanged between devices physically connected to each other during a link startup process. The connection information of the new device may be generated in an interface of the new device, and for example, the connection information may be added to a packet in a physical adapter layer (L1.5). A packet PACP_CAP_ind shown in FIGS. 12A and 12B is an example of the packet generated in the new device, and for example, the packet PACP_CAP_ind may have the same format as PACP_CAP_ind defined by the UniPro specification. The packet PACP_CAP_ind may include at least one reserved region, wherein ID information of the new device may be added to one reserved region.

Meanwhile, as shown in FIG. 12B, connection information includes various types of information other than a device ID.

Various types of information may exist as information indicating characteristics of a memory system, such as attribute information, state information, capacity information, product code information, and vendor version information of the memory system, as well as a device ID. According to an embodiment, connection information exchanged between devices in a storage system may include such various types of information, and for example, as shown in FIG. 12B, vendor version information, attribute information, and capacity information are added to the packet. In addition, the connection information may include other various parameters characterized in MIPI UniPro.

For example, each of the devices in a storage system may store vendor version information, attribute information, and capacity information in a management table, and the storage system may be managed accordingly. For example, various characteristics of a memory system, such as performance, a storage space, and capacity of a physical layer, may be determined based on such information, and the memory system may be managed while considering the characteristics. Also, for example, when capacity information of a memory system is provided to a host, the capacity information is provided through an operating system (OS) kernel in the host and thus a plurality of memory systems may be managed as one memory system having a large capacity.

Such various types of information may be added to a packet having a format of one layer (for example, a physical adapter layer), or may be added to separate packets through at least two layers according to one or more embodiments. For example, some of the various types of information may be added to a packet in a physical adapter layer (L1.5) according to the embodiments described above, and the remaining of the various types of information may be added to a packet supported by another layer in a link layer or to a packet supported by an external layer (for example, an application layer) of the link layer.

Hereinafter, a process of updating a management table in a multi-link manager as a new device is connected will now be described. Also, it is assumed that a plurality of devices perform communication according to a UFS protocol.

Figure 13A:
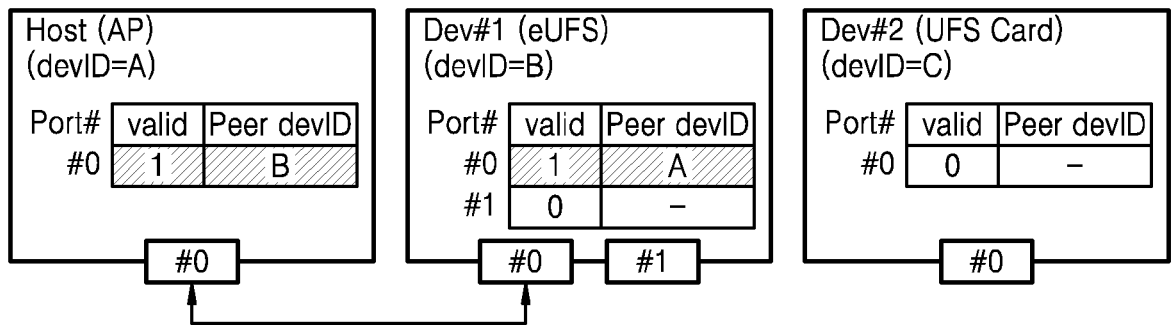
FIGS. 13A, 13B and 13C are block diagrams for describing an embodiment of update operations of a management table in a storage system.
Figure 13B:
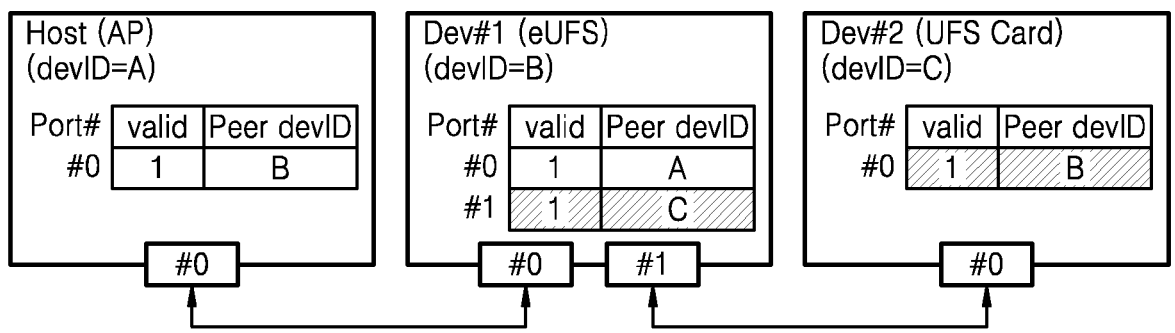
Figure 13C:
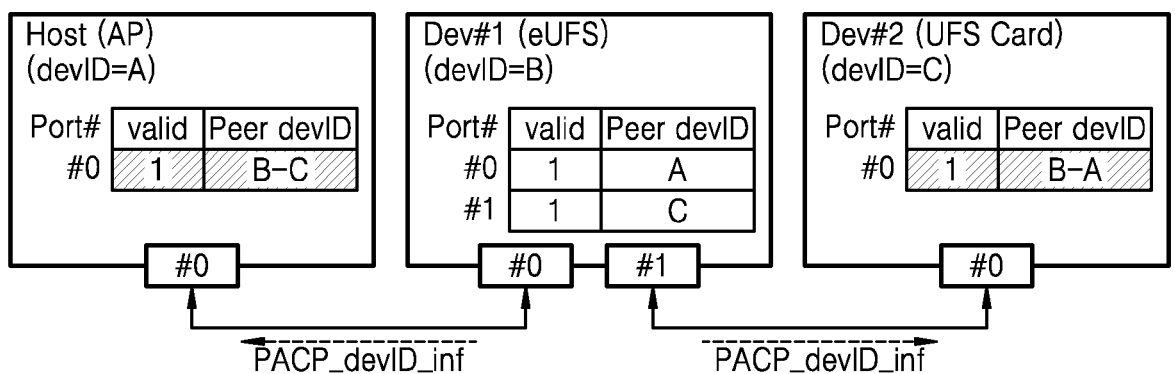

FIGS. 13A through 13C are block diagrams for describing an embodiment of update operations of a management table in a storage system. In FIGS. 13A through 13C, the application processor AP, as the host HOST, is connected to a plurality of devices, wherein the host HOST is physically connected to a first device (for example, the UFS embedded memory eUFS), and the UFS embedded memory eUFS is newly physically connected to a second device (for example, the UFS memory card UFS Card). Here, the devices have a connection structure of a point-to-point form since one device is connected to another device through one port.

A first port #0 of the application processor AP is physically connected to a first port #0 of the UFS embedded memory eUFS, and when the storage system is turned on, a connection between the application processor AP and the UFS embedded memory eUFS is detected. Packets including a device ID are exchanged as described above during a link startup process for a link connection between the application processor AP and the UFS embedded memory eUFS, and management tables of the application processor AP and the UFS embedded memory eUFS are updated according to the exchanged packets.

For example, referring to FIG. 13A, the host HOST updates valid information corresponding to the first port #0 from a first value (for example, 0) to a second value (for example, 1) according to information included in the packet received from the UFS embedded memory eUFS, and updates a value of an ID field (Peer devID) corresponding to the first port #0 to a value (for example, B) indicating a device ID of the UFS embedded memory eUFS. Similarly, the UFS embedded memory eUFS updates valid information corresponding to the first port #0 from a first value to a second value according to information included in the packet received from the host HOST, and updates a value of an ID field corresponding to the first port #0 to a value (for example, A) indicating a device ID of the host HOST.

Then, as shown in FIG. 13B, as the UFS memory card UFS Card is physically connected to a second port #1 of the UFS embedded memory eUFS, a link startup process for a link connection between the UFS memory card UFS Card and the UFS embedded memory eUFS is performed, and at this time, packets including a device ID described above are exchanged. The UFS embedded memory eUFS updates valid information corresponding to the second port #1 from a first value to a second value, and also updates a value of an ID field corresponding to the second port #1 to a value (for example, C) indicating a device ID of the UFS memory card UFS Card. Also, the UFS memory card UFS Card updates valid information corresponding to the first port #0 from a first value to a second value, and also updates a value of an ID field corresponding to the first port #0 to a value (for example, B) indicating the device ID of the UFS embedded memory eUFS.

Then, as shown in FIG. 13C, the UFS embedded memory eUFS may provide connection information including the device ID further to a pre-connected device or a newly connected device. For example, the connection information may be packetized, and the connection information may be added to any one of various types of packets, such as a packet having a PACP format defined by the specification of UniPro. According to an embodiment, a name of the packet provided to the pre-connected device or the newly connected device may be variously defined, and in FIG. 13C, the name of the packet is PACP_devID_inf.

The UFS embedded memory eUFS may generate and provide the packet PACP_devID_inf to the pre-connected device, for example, the host HOST. The packet PACP_devID_inf may be generated in a certain layer, for example, in a physical adapter layer (L1.5) described above. The packet PACP_devID_inf may be transmitted according to any one of various protocols, and for example, a request/confirm protocol used during PACP exchange according to specification of UniPro may be used. The packet PACP_devID_inf may include the device ID of the UFS memory card UFS Card that is newly connected, and the host HOST may check new connection information through the packet PACP_devID_inf.

As information of the UFS memory card UFS Card that is newly connected is provided through the first port #0 of the host HOST, the host HOST may update connection information corresponding to the first port #0. For example, information (B-C) indicating that the UFS embedded memory eUFS and the UFS memory card UFS Card are sequentially connected through the first port #0 may be updated in the ID field corresponding to the first port #0. In other words, connection information of at least two devices may be stored with respect to one port.

Also, the UFS embedded memory eUFS may generate the packet PACP_devID_inf including information of the host HOST that is pre-connected, and provide the packet PACP_devID_inf to the UFS memory card UFS Card that is newly connected. The UFS memory card UFS Card may update the connection information corresponding to the first port #0 by using the packet PACP_devID_inf. For example, information (B-A) indicating that the UFS embedded memory eUFS and the host HOST are sequentially connected through the first port #0 may be updated in the ID field corresponding to the first port #0.

Figure 14A:
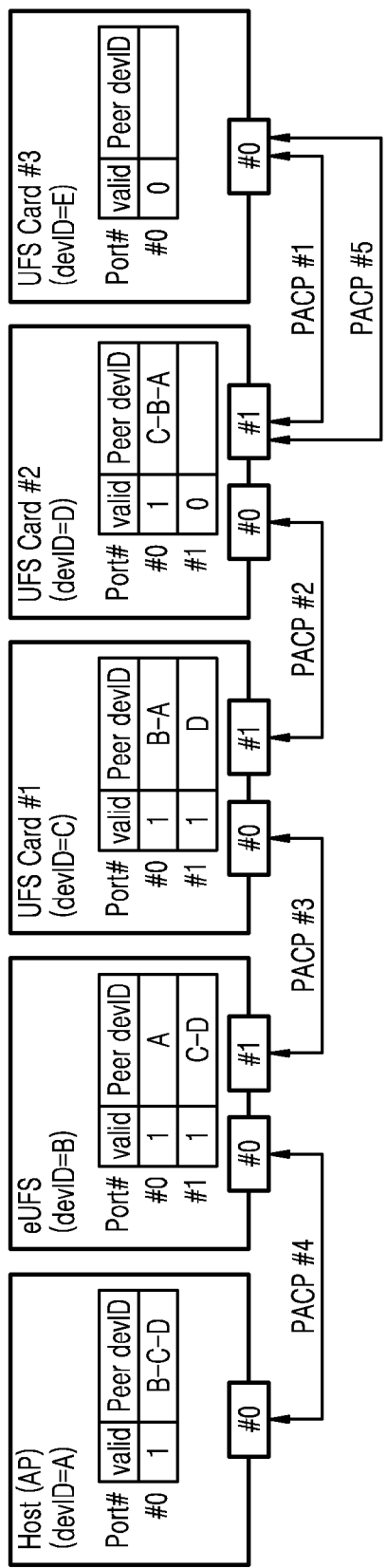
FIGS. 14A and 14B are block diagrams showing examples of updating connection information in a structure in which a plurality of devices are connected.
Figure 14B:
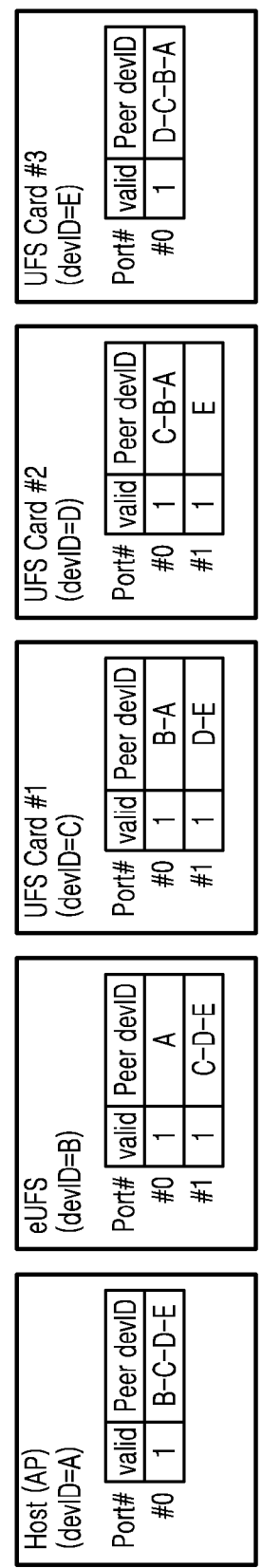

FIGS. 14A and 14B are block diagrams showing examples of updating connection information in a structure in which a plurality of devices are connected. In FIGS. 14A and 14B, the host HOST, the UFS embedded memory eUFS, and first through third UFS memory cards UFS Card #1 through #3 are illustrated, wherein the third UFS memory card UFS Card #3 having a device ID of E is newly connected.

Referring to FIG. 14A, a first port #0 of the third UFS memory card UFS Card #3 is physically connected to a second port #1 of the second UFS memory card UFS Card #2, and a packet PACP #1 including a device ID is exchanged between the third and second UFS memory cards UFS Card #3 and #2. The device ID, i.e., D, of the second UFS memory card UFS Card #2 is updated with respect to the first port #0 in a management table of the third UFS memory card UFS Card #3, and the device ID, i.e. E, of the third UFS memory card UFS Card #3 is updated with respect to the second port #1 in a management table of the second UFS memory card UFS Card #2.

The second UFS memory card UFS Card #2 provides information of the third UFS memory card UFS Card #3 to a pre-connected device, and for example, a packet PACP #2 is exchanged between the first port #0 of the second UFS memory card UFS Card #2 and the second port #1 of the first UFS memory card UFS Card #1. Also, the device ID, i.e., E, of the third UFS memory card UFS Card #3 is updated with respect to the second port #2 in a management table of the first UFS memory card UFS Card #1.

Similarly, a packet PACP #3 is exchanged between the first port #0 of the first UFS memory card UFS Card #1 and the second port #1 of the UFS embedded memory eUFS, and information of the device ID, i.e., E, of the third UFS memory card UFS Card #3 is updated with respect to the second port #1 in the management table of the UFS embedded memory eUFS. Also, a packet PACP #4 is exchanged between the first port #0 of the UFS embedded memory eUFS and the first port #0 of the host HOST, and information of the device ID, i.e., E, of the third UFS memory card UFS Card #3 is updated with respect to the first port #0 in the management table of the host HOST.

Also, a packet PACP #5 is exchanged between the second port #1 of the second UFS memory card UFS Card #2 and the first port #0 of the third UFS memory card UFS Card #3, and the third UFS memory card UFS Card #3 receives information of device ID if a plurality of devices that are pre-connected to the second UFS memory card UFS Card #2, for example, the host HOST, the UFS embedded memory eUFS, and the first UFS memory card UFS Card #1. The information of the device ID, i.e., C, B, and A, of the plurality of devices is updated with respect to the first port #0 in the management table of the third UFS memory card UFS Card #3.

According to such updates, information stored in a management table of each device may be changed as shown in FIGS. 14A and 14B. Referring to the management table of the host HOST, ID information (B-C-D-E) may be stored according to an order of devices sequentially connected through the first port #0 of the host HOST. Also, referring to the management table of the third UFS memory card UFS Card #3, ID information (D-C-B-A) may be stored according to an order of devices sequentially connected through the first port #0 of the third UFS memory card UFS Card #3.

FIGS. 15A and 15B are block diagrams for describing update operations of a management table of a device, according to an embodiment. In FIGS. 15A and 15B, a management table is updated when one device is connected to at least two devices through a plurality of ports. Also, in FIGS. 15A and 15B, the host HOST, the UFS embedded memory eUFS, and the first UFS memory card UFS Card #1 are pre-connected, and the second UFS memory card UFS Card #2 is newly connected to the UFS embedded memory eUFS. In other words, the first and second UFS memory cards UFS Card #1 and #2 are connected to the UFS embedded memory eUFS in parallel through separate channels.

Referring to FIG. 15A, as the second UFS memory card UFS Card #2 is connected, a packet PACP #1 including a device ID is exchanged between the second UFS memory card UFS Card #2 and the UFS embedded memory eUFS. Accordingly, the device ID, i.e., D, of the second UFS memory card UFS Card #2 is updated with respect to the second port #1 in the management table of the UFS embedded memory eUFS, and information of the device ID, i.e., B, of the UFS embedded memory eUFS is updated with respect to the first port #0 in the management table of the second UFS memory card UFS Card #2.

The UFS embedded memory eUFS provides information of the second UFS memory card UFS Card #2 that is newly connected to a pre-connected device, and for example, a packet PACP #2 including new connection information is exchanged between the UFS embedded memory eUFS and the host HOST, and also, a packet PACP #3 including the new connection information may be exchanged between the UFS embedded memory eUFS and the first UFS memory card UFS Card #1. Also, a packet PACP #4 including connection information about existing devices may be exchanged between the UFS embedded memory eUFS and the second UFS memory card UFS Card #2.

According to such operations, a management table of each device may be updated as shown in FIGS. 15A and 15B. Referring to the management table of the host HOST, the host HOST may be connected to two communication paths through the first port #0, and for example, ID information (B-C) of the UFS embedded memory eUFS and the first UFS memory card UFS Card #1 may be stored with respect to the first port #0, and at the same time, ID information (B-D) of the UFS embedded memory eUFS and the second UFS memory card UFS Card #2 may be stored with respect to the first port #0.

Meanwhile, referring to the management table of the first UFS memory card UFS Card #1, the first UFS memory card UFS Card #1 may be connected to two communication paths through the first port #0, and for example, ID information (B-A) of the UFS embedded memory eUFS and the host HOST may be stored with respect to the first port #0, and at the same time, ID information (B-D) of the UFS embedded memory eUFS and the second UFS memory card UFS Card #2 may be stored with respect to the first port #0. Similarly, referring to the management table of the second UFS memory card UFS Card #2, ID information (B-A) of the UFS embedded memory eUFS and the host HOST may be stored with respect to the first port #0, and at the same time, ID information (B-C) of the UFS embedded memory eUFS and the first UFS memory card UFS Card #1 may be stored with respect to the first port #0.

One or more embodiments may be applied to storage systems having various types of network topologies, in addition to structures of storage systems described with reference to FIGS. 13A through 15B. In other words, one or more embodiments may vary, and processes of updating a management table may also be modified.

Figure 16:
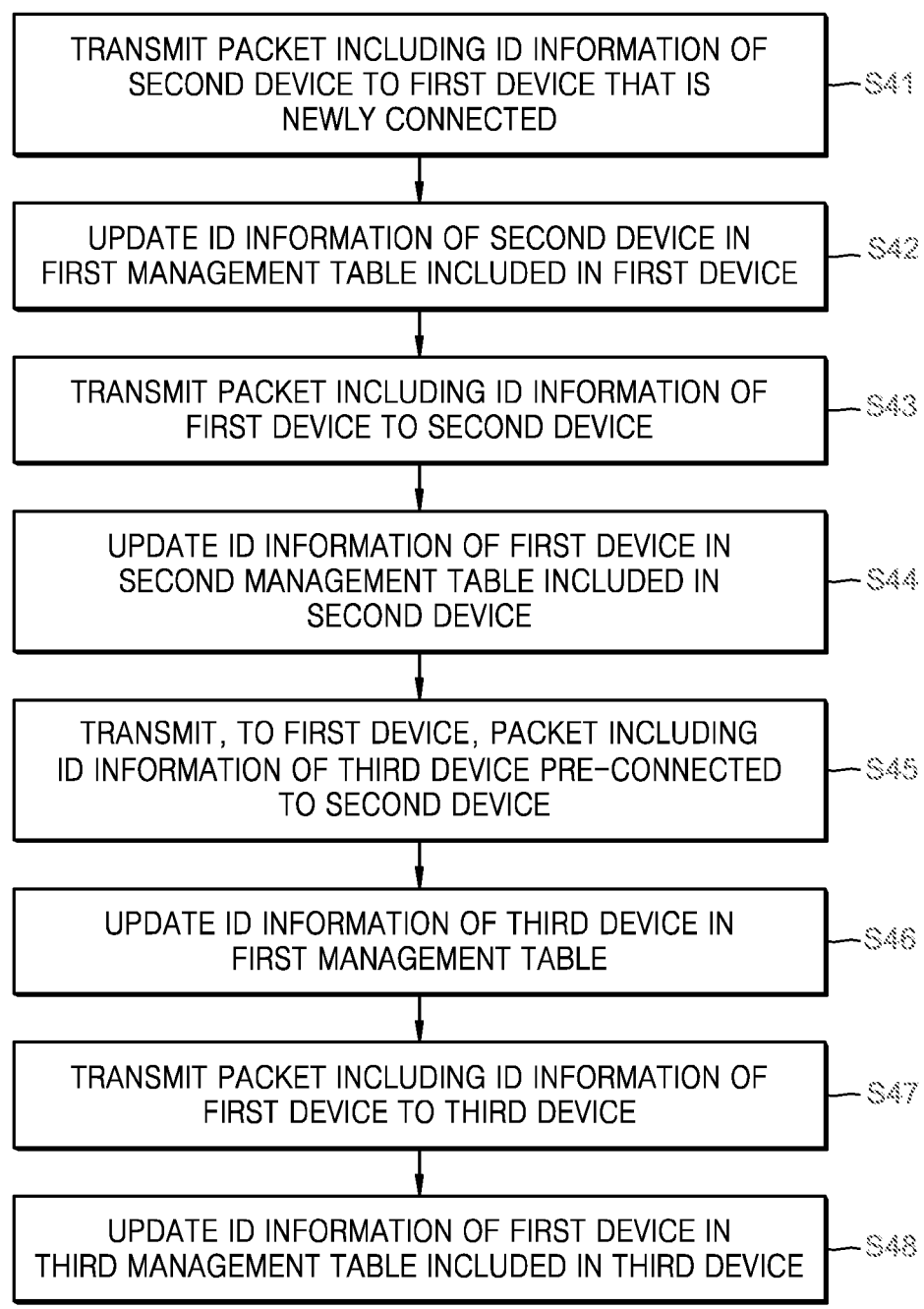
FIG. 16 is a flowchart of an embodiment of a communication method between semiconductor devices.

FIG. 16 is a flowchart of an embodiment of a communication method in a storage system. In FIG. 16, the storage system included in a mobile platform includes a plurality of devices, and the communication method is performed between the plurality of devices.

First, as a first device (for example, a memory card) and a second device (for example, an embedded memory) are physically connected to each other, a link startup process for a link connection is performed between the first and second devices, and a packet including ID information of the second device is generated and transmitted to the first device during the link startup process, in operation S41. Accordingly, the first device receives the packet including the ID information of the second device. The first device includes a first management table, and the ID information of the second device is updated in the first management table according to information included in the packet, in operation S42.

Also, during the link startup process, a packet including ID information of the first device is generated and transmitted to the second device in operation S43. Accordingly, the second device receives the packet including the ID information of the first device. The second device includes a second management table, and the ID information of the first device is updated in the second management table according to information included in the packet, in operation S44.

The second device is physically pre-connected to a third device (for example, a host), and a packet including ID information of the third device may be generated by the second device and transmitted from the second device to the first device in operation S45. Accordingly, the first device includes the packet including the ID information of the third device. The ID information of the third device is updated in the first management table according to information included in the packet, in operation S46.

Also, a packet including the ID information of the first device is generated by the second device, and is transmitted from the second device to the third device in operation S47. Accordingly, the third device receives the packet including the ID information of the first device. The ID information of the first device is updated in the third management table according to information included in the packet, in operation S48.

Figure 17A:
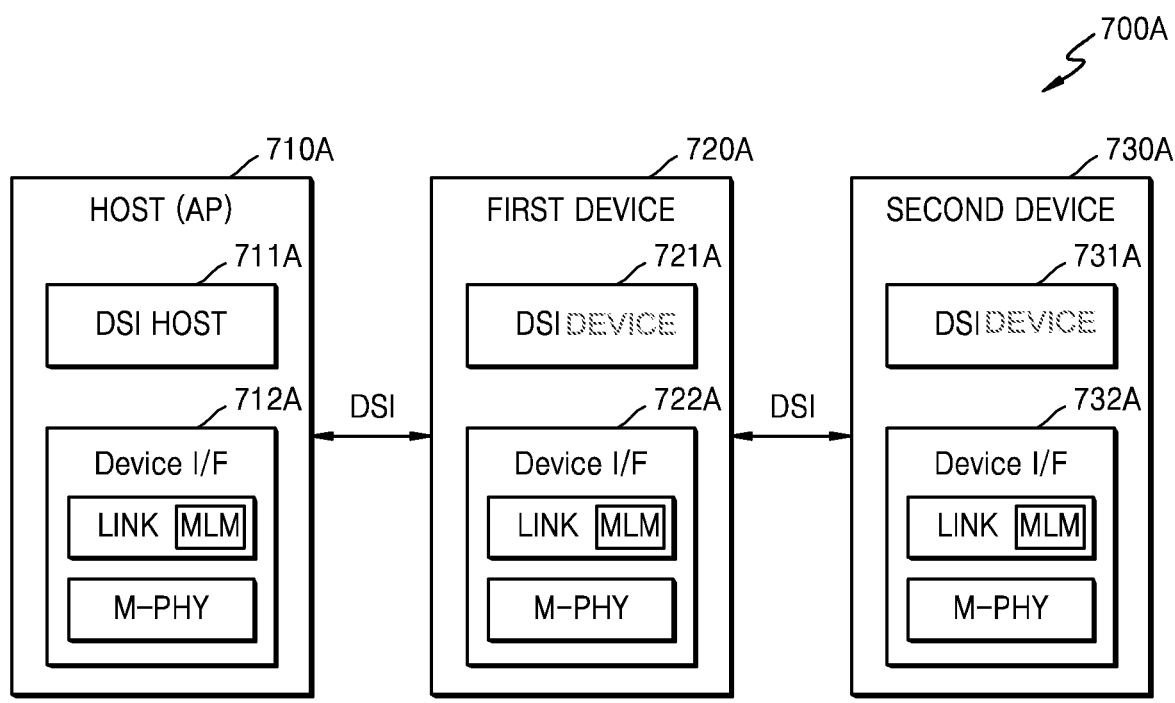
FIGS. 17A and 17B are block diagrams of examples in which embodiments of multi-link managers (MLMs) are applied to various host apparatuses.
Figure 17B:
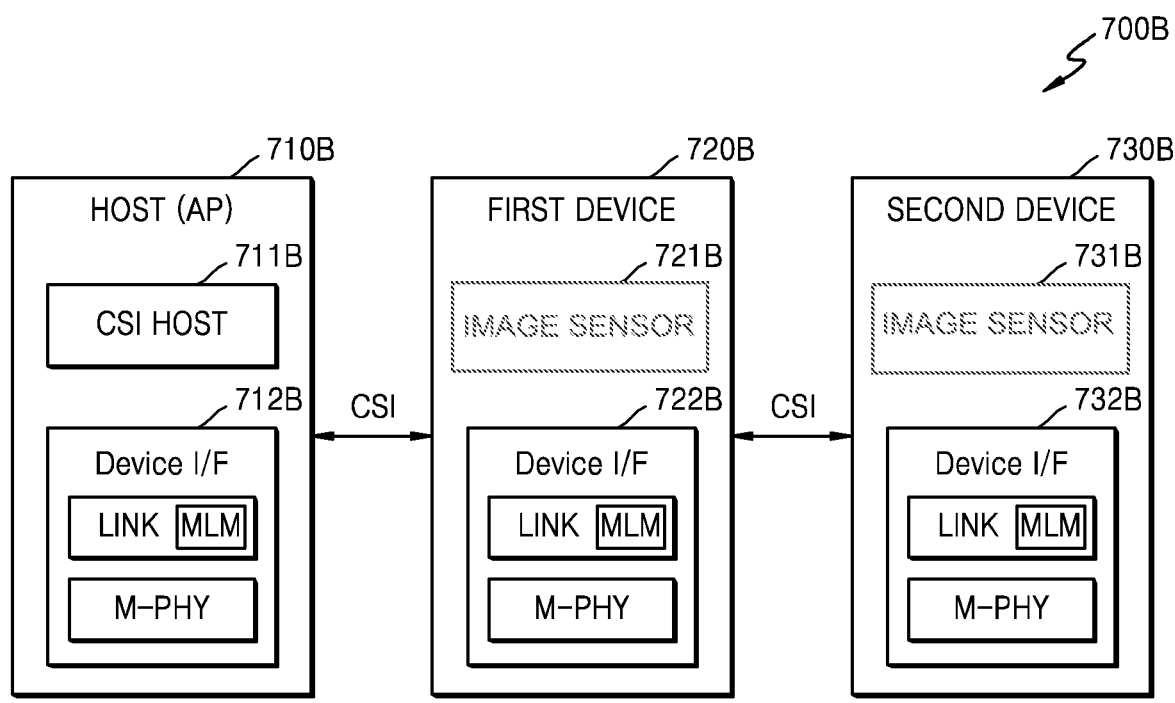

FIGS. 17A and 17B are block diagrams of examples in which embodiments of multi-link managers (MLMs) are applied to various host apparatuses.

In the above embodiments, a communication example in a storage system including a memory system as a component has been described, but an embodiment is not limited thereto. For example, an embodiment may be applied to various interfaces using a combination of UniPro and M-PHY from among interfaces using MIPI.

For example, referring to FIG. 17A, a data processing system 700A may include a host 710A, a first device 720A, and a second device 730A. Host 710A may include various types of host apparatuses, and for example, host 710A may include a display serial interface (DSI) host apparatus 711A. Also, host 710A may include a device interface 712A for an interface operation of DSI host apparatus 711A. According to an embodiment, device interface 712A may include a link layer LINK and a physical layer M-PHY. Also, device interface 712A may further include a multi-link manager MLM.

DSI host apparatus 711A may control display operations through device interface 712A. First device 720A may include a DSI device or apparatus 721A and a device interface 722A, and second device 730A may include a DSI device or apparatus 731A and a device interface 732A. Each of device interfaces 722A and 732A may include the link layer LINK and the physical layer M-PHY, and may further include the multi-link manager MLM. Also, each of first and second devices 720A and 730A may include a display apparatus.

Host 710A, first device 720A, and second device 730A may communicate with each other according to a DSI protocol. At least one of first and second devices 720A and 730A may be detachably connected. When a new device is connected, information stored in the multi-link manager MLM included in the data processing system 700A may be updated according to the embodiments described above.

Meanwhile, FIG. 17B illustrates a data processing system 700B according to another embodiment. Referring to FIG. 17B, data processing system 700B may include a host 710B, a first device 720B, and a second device 730B. Host 710B may include, as one of various types of host apparatuses, a camera serial interface (CSI) host apparatus 711B. Also, host 710B may include a device interface 712B for interface operations of CSI host apparatus 711B. According to an embodiment, device interface 712B may include a link layer LINK and a physical layer M-PHY. Also, device interface 712B may further include a multi-link manager MLM.

Data processing system 700B of FIG. 17B may operate in the same or similar manner as data processing system 700A of FIG. 17A. CSI host apparatus 711B may control operations related to an image sensor, and each of first and second devices 720B and 730B may include an image sensor 721B and 731B, respectively. Also, each of first and second devices 720B and 730B may include the link layer LINK, the physical layer M-PHY, and the multi-link manager MLM, and when a new device is newly connected, information stored in the multimedia manger MLM included in data processing system 700B may be updated.

Figure 18A:
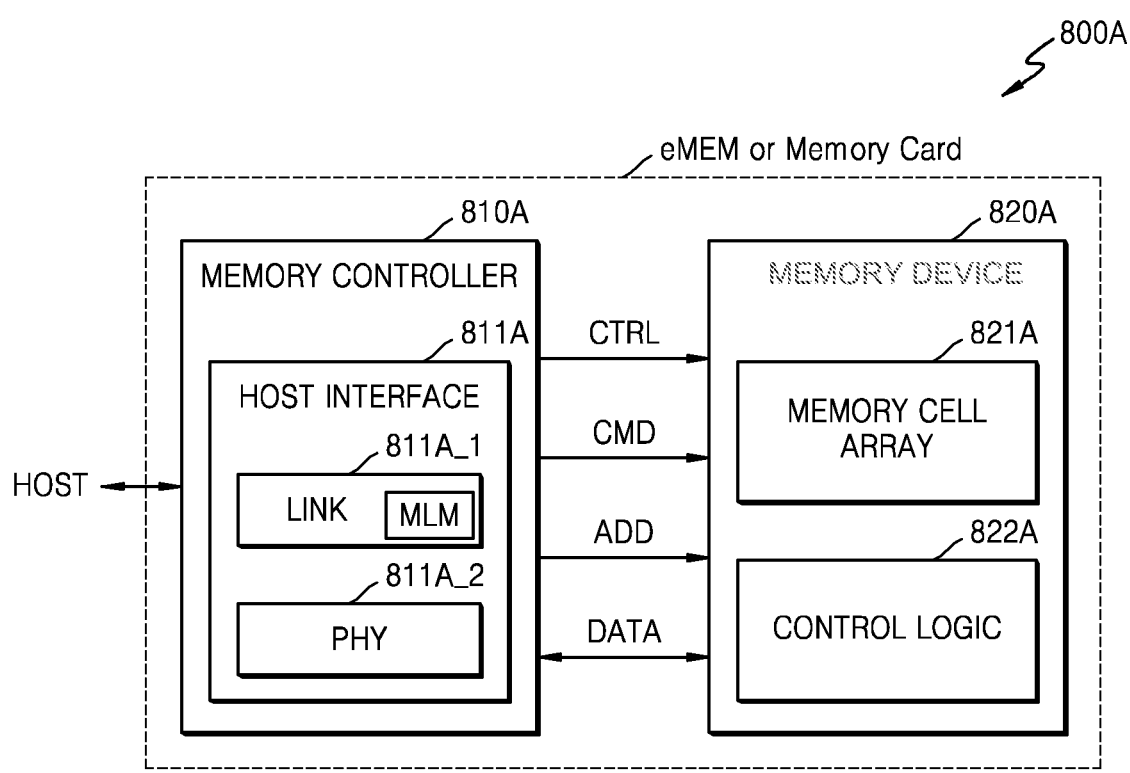
FIGS. 18A and 18B are block diagrams of embodiments of memory systems.
Figure 18B:
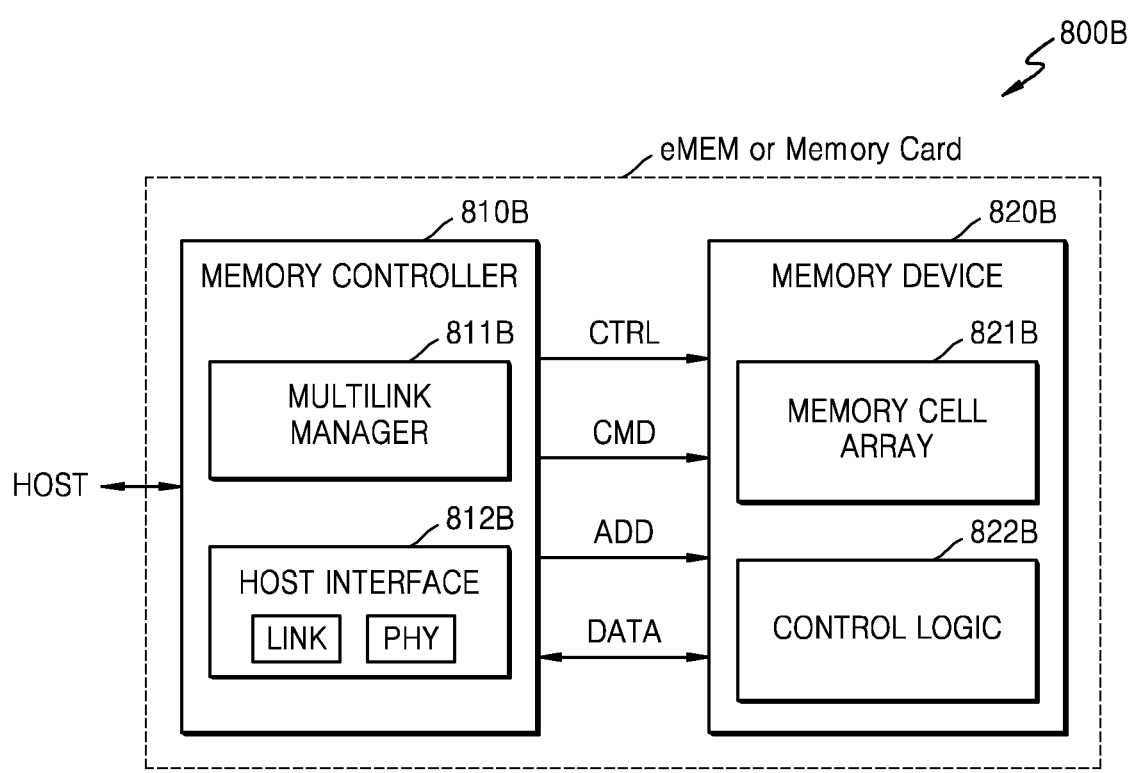

FIGS. 18A and 18B are block diagrams of embodiments of memory systems 800A and 800B. Each of memory systems 800A and 800B may be an embedded memory or a memory card as described above.

Referring to FIG. 18A, memory system 800A may include a memory controller 810A and a memory device 820A. Memory controller 810A may read data stored in memory device 820A or control memory device 820A to write data in memory device 820A in response to a write/read request from the host HOST. For example, memory controller 810A provides a command CMD, an address ADD, and a control signal CTRL to memory device 820A to control program (or write), read, and erase operations with respect to memory device 820A. Also, the data DATA that is to be written and that is read may be exchanged between memory controller 810A and memory device 820A.

Memory controller 810A includes a host interface 811A for communication with the host HOST, and host interface 811A may include a link layer 811A_1 and a physical layer 811A_2 operating according to the embodiments described above. Also, link layer 811A_1 may include a multi-link manager MLM managing connection information of devices. Memory system 800A may include a plurality of ports (not shown), wherein at least two devices may be multi-connected through one port. The multi-link manager MLM may store ID information of devices physically or indirectly connected to each of the plurality of ports.

Meanwhile, memory device 820A may include a memory cell array 821A and a control logic 822A controlling reading and writing of the data DATA with respect to memory cell array 821A. Memory cell array 821A may include a plurality of regions, and for example, may include a plurality of cell blocks as units in which data is erased.

Meanwhile, memory system 800B of FIG. 18B according to another embodiment may include a memory controller 810B and a memory device 820B. Memory controller 810B may include a multi-link manager 811B and a host interface 812B, wherein host interface 812B may include a link layer and a physical layer. Also, memory device 820B may include a memory cell array 821B and a control logic 822B.

In FIG. 18B, multi-link manager 811B is included outside host interface 812B, wherein multi-link manager 811B is realized as hardware and memory controller 810B may be controlled via hardware or software by a CPU (not shown).

Meanwhile, memory cell arrays 821A and 821B each may be a 3-dimensional (3D) memory cell array. The 3D memory cell array is monolithically formed on at least one physical level of memory cell arrays including an active region provided above a silicon substrate and a circuit formed above or in the silicon substrate as a circuit related to operations of memory cells. The term "monolithic" means that layers of each level forming an array are stacked immediately above layers of each lower level from among the array.

According to an embodiment, the 3D memory cell array includes NAND strings provided in a vertical direction such that at least one memory cell is provided on another memory cell. The at least one memory cell may include a charge trapping layer. U.S. Pat. Nos. 7,679,133, 8,553,466, 8,654, 587, 8,559,235, and US Patent Application Publication 2011-0233648 disclose suitable structures of a 3D memory cell array having a plurality of levels, wherein word lines and/or bit lines are shared between levels, and are incorporated herein by reference. Also, US Patent Application Publication 2012-0051138 and US Patent Application Publication 2011-0204420 are incorporated herein by reference.

Figure 19:
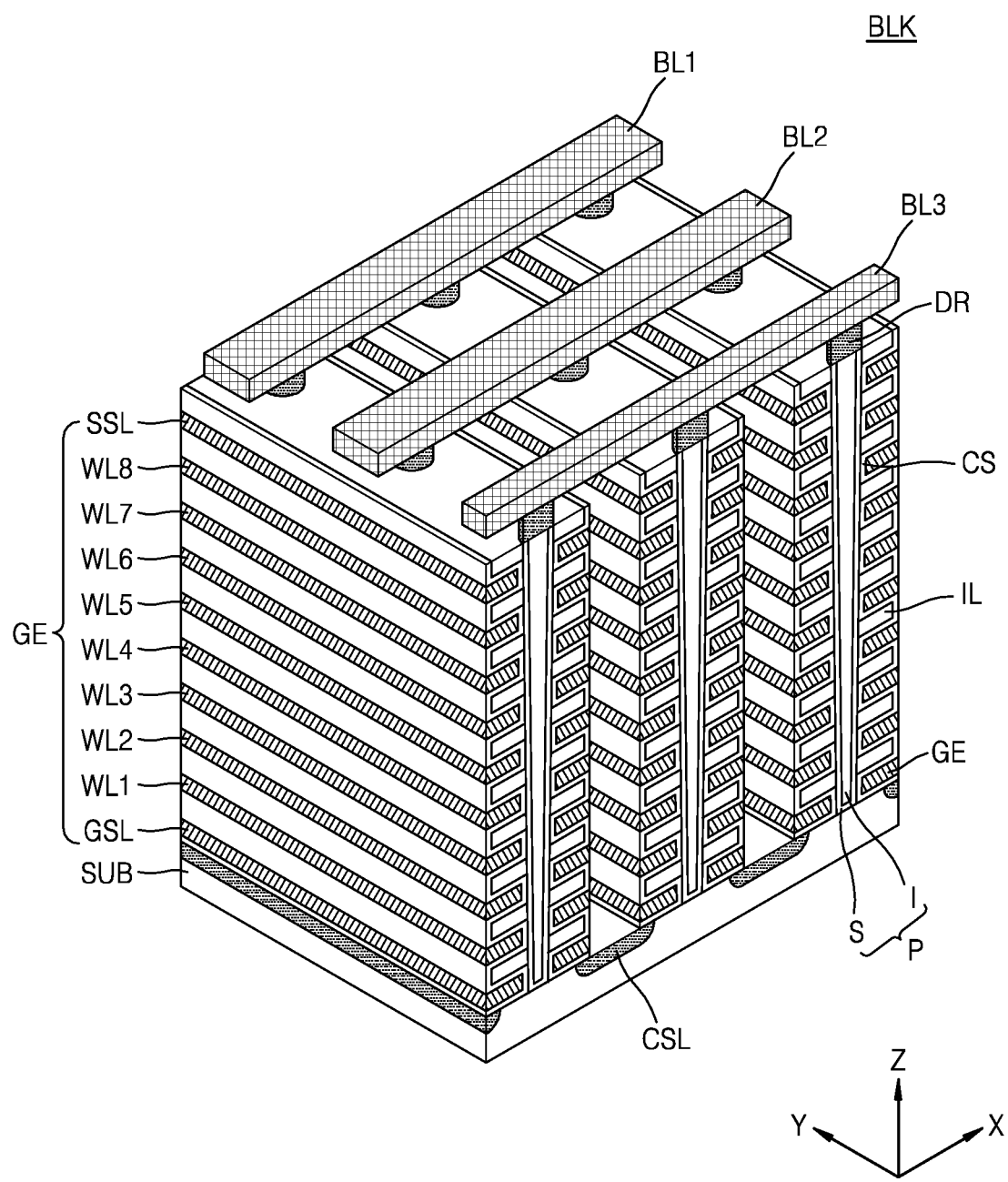
FIG. 19 is a perspective view of an embodiment of a cell block of one of memory cell arrays of FIGS. 18A and 18B.

FIG. 19 is a perspective view of an embodiment of a cell block BLK of one of memory cell arrays 821A and 821B of FIGS. 18A and 18B.

Referring to FIG. 19, the cell block BLK is formed in a vertical direction with respect to a substrate SUB. In FIG. 19, the cell block BLK includes two select lines GSL and SSL, eight word lines WL1 through WL8, and three bit lines BL1 through BL3, but the numbers of lines are not limited thereto.

The substrate SUB has a first conductivity type, for example, a p-type, and a common source line CSL extending along a first direction (for example, a Y-direction) is provided above the substrate SUB and doped with second conductivity type (for example, an n-type) impurities. A plurality of insulating layers IL extending along the first direction are provided sequentially along a third direction (for example, a Z-direction) over a region of the substrate SUB between the two adjacent common source lines CSL, wherein the plurality of insulating layers IL are spaced apart from each other by a certain distance along the third direction. The plurality of insulating layers IL may include an insulating material, such as silicon oxide.

A plurality of pillars P sequentially disposed along the first direction and penetrating through the plurality of insulating layers IL along the third direction are provided over the region of the substrate SUB between the two adjacent common source lines CSL. For example, the plurality of pillars P may contact the substrate SUB through the plurality of insulating layers IL. For example, a surface layer S of the pillar P may include a first type silicon material and may function as a channel region. Meanwhile, an inner layer I of the pillar P may include an insulating material, such as silicon oxide, or an air gap.

A charge storage layer CS is provided along exposed surfaces of the insulating layers IL, the pillars P, and the substrate SUB in the region between the two adjacent common source lines CSL. The charge storage layer CS may include a gate insulating layer (also referred to as a tunneling insulating layer), a charge trapping layer, and a blocking insulating layer. For example, the charge storage layer CS may have an oxide-nitride-oxide (ONO) structure. Also, a gate electrode GE like the select lines GSL and SSL and the word lines WL1 through WL8 is provided over the exposed surface of the charge storage layer CS in the region between the two adjacent common source lines CSL.

Drains DR or drain contacts are provided over each of the pillars P. For example, the drains DR or the drain contacts may include an impurity-doped silicon material having the second conductive type. The bit lines BL1 through BL3 extending along a second direction (for example, an X-direction) and spaced apart from each other by a certain distance along the first direction are provided over the drains DR.

According to one or more embodiments of operating methods of a semiconductor device and a memory system, and a communication method of a storage system, since ID information of a newly connected device is provided to a plurality of devices pre-connected in a mobile platform and managed, the storage system may be efficiently used.

Also, according to one or more embodiments of operating methods of a semiconductor device and a memory system, and a communication method of a storage system, since information indicating a physical connection order of devices that are multi-connected is managed, data transmission may be efficiently managed in a mobile platform.

While the inventive concept has been particularly shown and described with reference to embodiments thereof, it will be understood that various changes in form and details may be made therein without departing from the spirit and scope of the following claims.

What is claimed is:

1. An operating method of a memory system, the operating method comprising:
   receiving at the memory system connection information of a first device, including ID information of the first device, which is separate from and not included in the memory system while connecting the memory system to the first device;
   the memory system updating information of a management table included in the memory system by using the connection information of the first device, including storing in the management table the ID information of the first device; and
   the memory system generating and transmitting, to a second device, which is separate from and not included in the memory system and is pre-connected to the memory system prior to connection of the first device to the memory system, a first packet comprising the connection information of the first device, including the ID information of the first device.

2. The operating method of claim 1, further comprising the memory system generating and transmitting to the first device a second packet comprising connection information of the second device, including ID information of the second device.

3. The operating method of claim 2, further comprising:
   the memory system receiving connection information of a third device newly connected to the first device, including the ID information of the third device; and
   updating the information of the management table in the memory system by using the connection information of the third device, including storing in the management table the ID information of the third device.

4. The operating method of claim 3, wherein information related to a physical connection order of the first device and the third device is stored in the management table of the memory system.

5. The operating method of claim 2, wherein the first device is a memory card, the second device is a host, and the memory system is an embedded memory physically connected to the host.

6. A communication method of a storage system, the communication method comprising:
   receiving, by a first device, a packet comprising identification (ID) information of a second device as the first device is connected to the second device;
   updating the ID information of the second device in a first management table included in the first device; and
   receiving, by the first device, a packet comprising ID information of at least one third device, wherein the at least one third device was pre-connected to the second device prior to the second device being connected to the first device.

7. The communication method of claim 6, further comprising updating the ID information of the at least one third device in the first management table.

8. The communication method of claim 7, wherein information related to a physical connection order of the second device and the at least one third device is stored in the first management table.

9. The communication method of claim 6, further comprising:
   receiving, by the second device, a packet comprising ID information of the first device; and
   updating the ID information of the first device in a second management table included in the second device.

10. The communication method of claim 9, further comprising receiving, by the at least one third device, the packet comprising the ID information of the first device.

11. The communication method of claim 10, wherein information related to a physical connection order of the second device and the first device is stored in a third management table included in the at least one third device.

12. The communication method of claim 6, wherein the first device is a universal flash storage (UFS) memory card, the second device is a UFS embedded memory, and the at least one third device is a host apparatus in an application processor.

13. The communication method of claim 6, wherein each of the first device, the second device, and the at least one third device comprises an interface comprising a physical layer and a link layer, wherein the link layer has a hierarchical structure comprising a physical adapter layer, a data link layer, and a network layer,
   wherein ID information of the second device and ID information of the at least one third device are each added to the packet in the physical adapter layer.

14. A method, comprising:
maintaining at a first device of a storage system, which includes at least one memory cell array, a management table which includes first information which identifies other devices which are connected directly and indirectly to the first device, including ID information of at least a second device which is connected to the first device, wherein the first device includes a device interface having at least a first two-way communication port and a second two-way communication port, wherein the second device is connected to the first device via the first two-way communication port;
receiving at the first device via the first two-way communication port one or more data packets from the second device, the one or more data packets including second ID information identifying at least a third device which is connected to the second device;
the first device updating the management table to include the second ID information identifying the third device which is connected to the second device; and
the first device generating and sending via the second two-way communication port one or more additional packets to a fourth device which is connected to the first device via the second two-way communication port, the one or more additional data packets identifying the third device which is connected to the second device.

15. The method of claim 14, wherein the second information further includes third ID information identifying a fifth device which is connected to the second device via the third device.

16. The method of claim 15, wherein the method further comprises generating and sending one or more additional packets to the fifth device which is connected to the second device via the third device.

17. The method of claim 14, wherein the first device is a memory system including the at least one memory cell array, and wherein the second device is a host.

18. The method of claim 14, wherein the first device is a host, and the second device is a memory system including the at least one memory cell array.

19. The method of claim 14, wherein the first device is a host of a data processing apparatus, and the second device is an embedded memory system of the data processing apparatus, and the third device is a memory card detachably connected to the data processing system.

20. The method of claim 14, wherein the first device is an embedded memory system of the storage system, the second device is a host of a data processing apparatus, and the fourth device is a memory card of the storage system.

\* \* \* \* \*